US008941583B2

(12) United States Patent
Campisi

(10) Patent No.: US 8,941,583 B2
(45) Date of Patent: Jan. 27, 2015

(54) DUAL PARTICLE ELECTROPHORETIC DISPLAY AND METHOD OF MANUFACTURING SAME

(71) Applicant: Copytele, Inc., Melville, NY (US)

(72) Inventor: Anthony J. Campisi, Setauket, NY (US)

(73) Assignee: Copytele, Inc., Melville, NY (US)

( * ) Notice: Subject to any disclaimer, the term of this patent is extended or adjusted under 35 U.S.C. 154(b) by 0 days.

(21) Appl. No.: 14/269,099

(22) Filed: May 3, 2014

(65) Prior Publication Data

US 2014/0240211 A1    Aug. 28, 2014

Related U.S. Application Data

(63) Continuation-in-part of application No. 13/589,613, filed on Aug. 20, 2012, now Pat. No. 8,754,845, which is a continuation-in-part of application No. 12/932,089, filed on Feb. 17, 2011, now Pat. No. 8,248,362, which is a continuation of application No. 12/931,983, filed on Feb. 15, 2011, now Pat. No. 8,436,807.

(51) Int. Cl.
*G09G 3/34* (2006.01)
*G02F 1/167* (2006.01)
*G02F 1/1343* (2006.01)

(52) U.S. Cl.
CPC ............... *G09G 3/344* (2013.01); *G02F 1/167* (2013.01); *G02F 1/134363* (2013.01); *G02F 2001/1672* (2013.01); *G02F 2001/1676* (2013.01)
USPC ........................................... 345/107; 349/50

(58) Field of Classification Search
USPC ......... 345/245, 247, 252–253, 265–275, 107; 349/49–50, 105, 107, 84, 153–154, 349/189–190
See application file for complete search history.

(56) References Cited

U.S. PATENT DOCUMENTS

| | | | |
|---|---|---|---|
| 4,833,484 A | 5/1989 | Garrood et al. | |
| 5,223,115 A | 6/1993 | DiSanto | |
| 5,279,511 A | 1/1994 | DiSanto | |
| 6,113,810 A | 9/2000 | Hou | |
| 6,327,072 B1 | 12/2001 | Comisky | |
| 6,639,580 B1 | 10/2003 | Kishi | |
| 7,289,101 B1 | 10/2007 | DiSanto | |
| 2007/0195399 A1 | 8/2007 | Aylward | |
| 2008/0266646 A1 | 10/2008 | Wilcox | |
| 2009/0066635 A1 | 3/2009 | Hong | |
| 2011/0007381 A1 | 1/2011 | Paolini | |

*Primary Examiner* — Joseph L Williams
(74) *Attorney, Agent, or Firm* — Law Office of Carl Giordano, PC

(57) ABSTRACT

A dual particle electrophoretic display and a method for manufacturing same are disclosed. The display comprises a back substrate and a transparent substrate forming a cavity therebetween. The transparent substrate including one or more cathode electrodes forming a plurality of electronically and selectively addressable pixels; one or more side walls extending from the transparent substrate, the side walls defining corresponding pixel cells, wherein a plurality of electrophoretic particles are contained in each cell and a substantially clear suspension fluid is distributed throughout the cavity by a gap formed between the site walls. A color or shade of the pixels within the display is determined by applying a driving voltage to the pixels of based on a desired level of Gray scale coding.

19 Claims, 22 Drawing Sheets

DUAL PARTICLE ELECTROPHORETIC DISPLAY AND METHOD OF MANUFACTURING SAME

CLAIM OF PRIORITY

This application claims pursuant to 35 USC 120, as a Continuation in part application, priority to and the benefit of, the earlier filing date of that patent application entitled "Method of Manufacturing an Electrophoretic Display, filed on Aug. 20, 2012 and afforded Ser. No. 13/589,613, (now U.S. Pat. No. 8,754,845), which claimed, as a Continuation-in-Part, priority to, and the benefit of the earlier filing date of that patent application entitled "Methods of Manufacturing an Electrophoretic Display, filed on Feb. 17, 2011 and afforded Ser. No. 12/932,089, (now U.S. Pat. No. 8,248,362), which is a continuation of, and claims priority to, that patent application entitled "Single Particle Electrophoretic Display and Method of Manufacturing Same," filed on Feb. 15, 2011, and assigned Ser. No. 12/931,983, (now U.S. Pat. No. 8,436,807) the entire contents of all of which are incorporated by reference, herein.

RELATED APPLICATION

This application is further related to that patent application entitled "Dual Particle Electrophoretic Display and Method of Manufacturing Same", filed on Feb. 17, 2011, and assigned Ser. No. 12/932,088 (now U.S. Pat. No. 8,519,944), the contents of which are incorporated by reference, herein.

BACKGROUND OF THE INVENTION

1. Field of the Invention

This invention relates generally to display devices, and, more particularly, to electrophoretic display devices.

2. Background Information

The electrophoretic effect operates on the principle that when electrophoretic particles are electrically charged to a particular polarity, the charged electrophoretic particles will migrate from a surface being charged to the same polarity as the charged particles toward a surface charged to a polarity opposite to that of the charged particles. For example, particles which are positively charged will migrate from a positively charged surface toward a negatively charged surface.

Display devices that utilize the electrophoretic effect are known as electrophoretic image displays (EPIDs). For example, U.S. Pat. No. 7,289,101, titled "Multi-Color Electrophoretic image Display", which issued on Oct. 30, 2007, and is assigned to CopyTele, Inc., is illustrative of an EPID. The EPID includes a plurality of cells, each containing electrophoretic particles, capable of displaying different colors when the particles in the cell move from a first position (e.g., rest) to a second position (e.g., display) in the cell. An electrode is coupled to each of the cells and is operative to move the particles from the first position to the second display position (or from the second position to the first position) when properly biased. In this EPID, the electrophoretic particle-containing cells are in fluid communication with one-another. In other types of EPIDs the particles are contained within sealed cells. The cells, whether sealed or partially open, (also referred to as a pixel) may be in a round, a square, a rectangular and/or honeycomb shape or other similar shapes that allow for maximizing the number of cells per unit area (e.g., hexagon, octagon).

The electrophoretic particles used in EPIDs may comprise light colored (light reflective) and/or dark colored (light absorbing) dielectric particles that are suspended in an optically contrasting clear fluid medium (suspension liquid). For example, U.S. Pat. No. 6,113,810, titled, "Methods Of Preparing Electrophoretic Dispersions Containing Two Types of Particles With Different Colors and Opposite Charges,", and assigned to CopyTele, Inc., describes a dielectric dispersion for use in a electrophoretic display that includes a dielectric fluid, a first plurality of particles of a first color having a surface charge of a selected polarity dispersed within the dielectric fluid and a second plurality of particles of a second color having a surface charge of opposite polarity to that of the first plurality and a steric repulsion thereto preventing coagulation of the first and second pluralities. As understood by those skilled in the art, the electrophoretic particles described herein may have optical properties that extend from totally light reflective (i.e., white) to totally non-reflective, light absorbing or opaque (i.e., black). Thus, reference to light colored particles refers to particles that have a greater light reflective property than a light absorbing property and dark colored particles refers to particles that have a greater light absorbing property than light reflecting property.

In accordance with the electrophoretic effect described above, the electrophoretic particles in the suspension liquids (fluid medium) selectively migrate to, and impinge upon, a transparent screen electrode, thereby displacing the fluid medium from the screen and creating the desired image.

EPIDs have many advantages over other types of flat panel displays. For example, EPIDs are composed of materials that are relatively inexpensive, and thus, the EPIDs are less costly to manufacture. Another advantage is that the image formed on the screen remains even when power is removed. When the electrophoretic particles or dye particles move to form an image, the image will not erase and remains on the display even after power is removed. Thus, the images created by EPIDs do not have to be refreshed as is necessary for images produced by Liquid Crystal Displays (LCDs) and other types of displays.

However, because an image is created by the movement of the electrophoretic particles within the fluid when the display is properly biased, the response time to view an image is dependent upon the time it takes the particles to move from a rest position to a display position.

Hence, there remains a need for an EPID with a faster response time that provides gray scale imaging that can be manufactured for low cost, and methods for manufacturing same.

SUMMARY OF THE INVENTION

A TFT based electrophoretic display is disclosed. The display comprises a first and second substrates that include a plurality of cells therebetween. Each of the cells containing electrophoretic particles capable of displaying at least one different color when the particles in the cell move from a first position to a second position within the cell and an electrode coupled to each of the cells, which when biased causes the particles to move from the first position to second display position (or from the second position to the first position). In one aspect of the invention, the cells are partially contained between the first and second substrates to allow for fluid communication of an electrophoretic fluid among the cells.

In another aspect of the invention, a method of filling an EPID with electrophoretic fluid is disclosed. In this aspect of the invention, pigment particles are deposited on a first substrate and joined to a second substrate to form a cavity between the first and second substrates. A vacuum is created between a first and second substrate, which includes a plurality of cells that are formed with side walls extending from one of the first and second substrates partially toward the other substrate. A gap formed between a top edge of the side walls extending from at least one of the first and second substrate and a surface of the opposing substrate is sized based on a characteristic or property of an electrophoretic suspension filling the cavity between the opposing first and second substrates. The gap size is sized to allow fluid communication of the electrophoretic suspension to flow from one cell to another.

BRIEF DESCRIPTION OF THE DRAWINGS

The advantages, nature and various additional features of the invention will appear more fully upon consideration of the illustrative embodiments now to be described in detail in connection with the accompanying drawings, wherein.

Figure 1A:
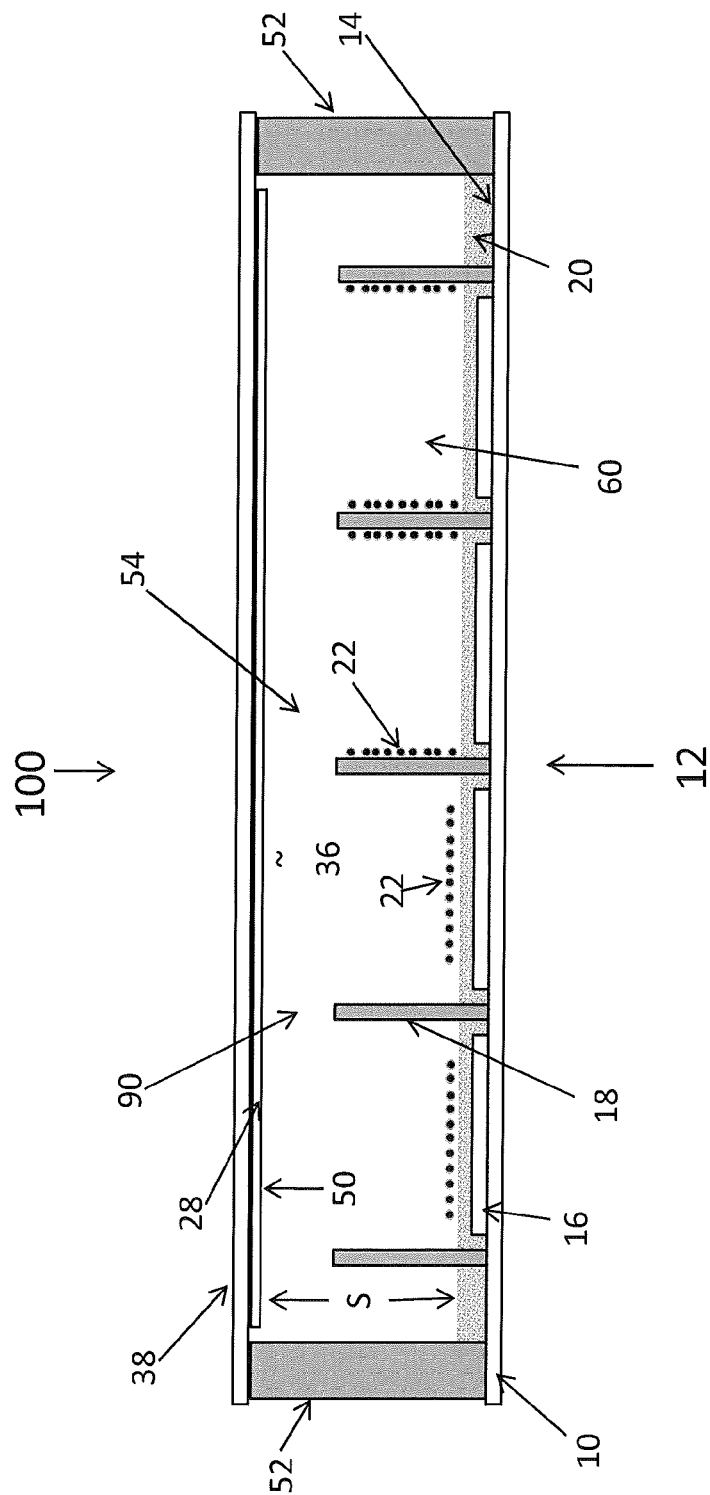
FIGS. 1A and 1B illustrate a cross-sectional view of an exemplary EPIDs according to an aspect of the invention.

It is to be understood that the drawings are solely for purposes of illustrating the various aspects of the invention and are not intended to define the limits or scope of the invention. Throughout the drawings and the specification, like reference numerals are used to indicate common features of the described devices and methods.

DETAILED DESCRIPTION OF THE INVENTION

The terms "a" or "an" as used herein are to describe elements and components of the invention. This is done merely for convenience and to give a general sense of the invention. The description herein should be read to include one or at least one and the singular also includes the plural unless indicated to the contrary.

The term "comprises", "comprising", "includes", "including", "as", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "or" refers to an inclusive "or" and not to an exclusive "or". For example, a condition A or B is satisfied by any one of the following: A is true (or present) and B is false (or not present); A is false (or not present) and B is true (or present); and both A and B are true (or present).

FIG. 1A illustrates a cross-sectional view of an electrophoretic image display (EPID) 100, according to an aspect of the invention. The EPID 100 includes a transparent substrate layer including a thin film transistor (TFT) active matrix substrate 10 constructed from a generally planar sheet of transparent material, for example, plastic or a glass, one or more transparent cathode electrodes 16 deposited on the transparent substrate, one or more anode electrodes 18 extending substantially perpendicular from the transparent substrate, a plurality of electrophoretic pigment particles 22, a substantially clear, and substantially particle-free electrophoretic suspension fluid 36, and a layer 28 disposed on a back substrate 38 constructed from a generally planar sheet of plastic or glass, the back substrate 38 being oppositely disposed from the transparent substrate layer 10. In this aspect of the invention, the electrophoretic pigment particles 22 are illustrated and described as being dark or black and the layer 28 as reflective (e.g., white). However, it should be understood that white or light colored particles and a dark or light absorbing layer 28 may also be suitable for use according to an aspect of the invention.

Figure 1B:
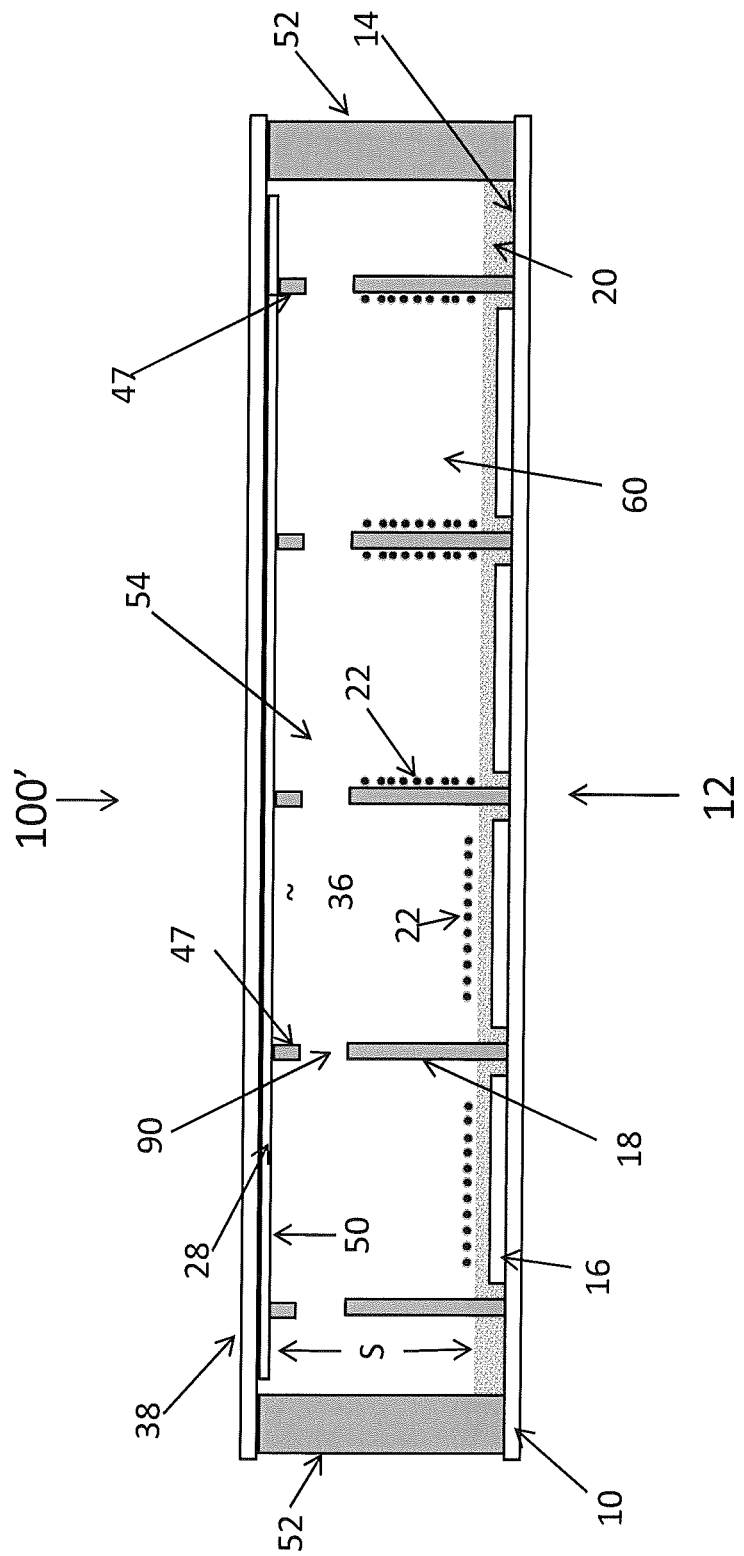

Substrates 10 and 38 are sealingly assembled together with spacers 52 to form a liquid and gas-sealed multi-cell enclosure 54 located between the TFT active matrix substrate 10, the back substrate 38 and electrode layer 28, and the spacers 52. The enclosure 54 includes a space designated as "S" located between the TFT active matrix substrate 10 and the electrode layer 28 disposed on the inner surface 50 of the back substrate 38, into which an electrophoretic, substantially clear suspension fluid 36 is deposited. The height of the space S between the substrate 10 and the electrode 28 is greater than the height of the walk of the anode electrodes 18, thus permitting fluid communication among the cells 60 (FIGS. 1A and 1B). That is, anode electrodes 18, which form the walls of a corresponding cell 60, extend from substrate 10 partially toward the oppositely disposed back substrate 38 and layer 28, but do not meet or touch the back substrate 38. Thus, a gap or opening 90 is formed between the inner surface of layer 28 and the top of the anodes 18 to allow fluid 36 to be freely dispersed among the cells 60 and within the enclosure 54. The advantages of the gap formed between the top surface of the anodes 18 and the inner surface of layer 28 in the manufacturing of the EPID are described herein. As fluid 36 is substantially particle free and not viscous, only a small gap is necessary to allow fluid 36 to be distributed throughout the cavity so as to fill each of the cells with substantially the same amount of fluid.

The TFT active matrix substrate 10 and the cathode electrodes 16 are transparent to allow light to pass therethrough. According to an aspect of the invention, the anode electrodes 18 are in the form of walls that extend substantially perpendicular from the inner surface 14 of the TFT active matrix substrate 10. Cathode electrodes 16 are deposited on the inner surface 14 of the TFT active matrix substrate 10 between, and are electrically isolated from, the anode electrodes 18.

Each cathode electrode 16 is fabricated on an inner surface 14 of the TFT active matrix substrate 10 by progressively depositing onto the inner surface 14 an electrically conductive material. For example, indium-tin-oxide (ITO) is a suitable transparent material that may be used. Other suitable materials with similar transparent and conductive properties may also be utilized.

The thickness of the cathode is preferable in a range less than 1.5 microns. An insulating material layer 20 composed of a material such as, $SiO_2$, or other equivalent insulating material, including but not limited to SiO or $SiN_x$ may be applied to the cathode electrodes 16 to protect and isolate the electrodes 16 on the TFT substrate 10 from being in physical contact with the fluid 36. The insulating material layer 20 preferably has a thickness in the range of boA (angstroms) to 2000 A (angstroms). The electrically conductive cathode 16, and the transparent insulating material 20 may be deposited using conventional semiconductor deposition techniques. An additional isolation layer may also be applied to the anode 18 to protect and isolate the anode 18. In preferred embodiments of the invention the particle sizes may be in the range often (10) nanometers to five (5) microns.

Cathodes 16 are electrically connected to corresponding TFTs on the TFT substrate 10 through well-known connection methods, which need not be discussed in the detail (see for example, U.S. Pat. No. 7,289,101). Cathodes 16 are TFT controlled conductors. When a selected voltage is applied, electrophoretic particles in a corresponding cell move from the cathode 16 to a corresponding anode 18 or from the anode 18 back to cathode 16. Anodes 18 are maintained at a relatively stable, non-varying, voltage level. In one aspect, the voltage on anode 18 may be set at a constant voltage between a fully on cathode 16 output voltage and a fully "off" cathode 16 voltage. In this manner, the electrophoretic particles may be moved in one direction when the cathode 16 is fully "on" and in the other direction when the cathode 15 is fully "off."

The anodes 18 in the form of walls 18 may be composed of a conductive material, or from an insulating material with a thin layer of conductive material disposed thereon. It should be understood that the walls may be formed from any suitable material, provided a layer of suitable conducting material is disposed thereon. Although not shown, it would be recognized at an electrical connection may be made to the anode 18 though well-known means. For example, the substrate may include a conductive layer, which is not shown in the figures, that is insulated from the TFT and cathode layers that provide electrical contact to the anodes 18. The conductive layer may include vias, electrically isolated from, and extending through the TFT and cathode layers to provide a means for providing a voltage to the anode 18, in another aspect the anodes 18 may be in direct contact with a conductive layer, which is deposited on another insulating layer deposited on the TFT/cathode layer.

Figure 2:
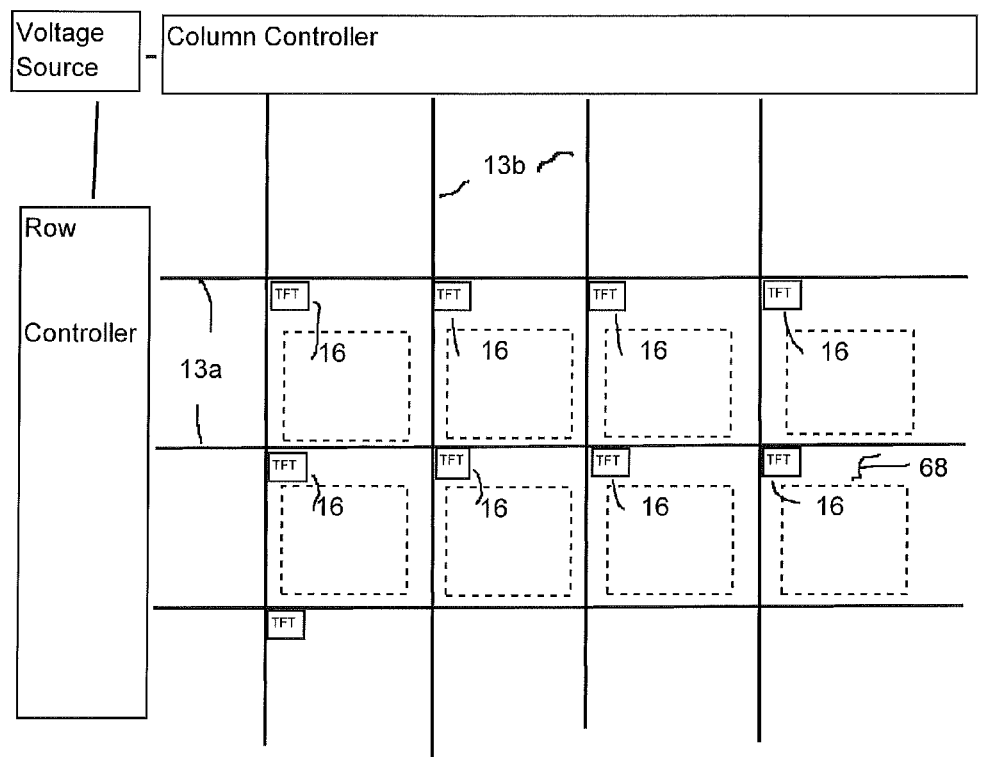
FIG. 2 illustrates a composite view of a transparent EPID active matrix substrate according to an aspect of the invention.

Referring to FIGS. 1A and 2, the anode electrodes 18, in the form of walls, are shown surrounding and interposed between each transparent cathode electrode 16 for form a cell 60. One or more cells 60 are formed by the anode electrodes 18 in conjunction with the cathode electrodes 16, and resemble an egg-crate structure. From the viewing side 12 of the device, each cell 60 defines at least one pixel, and the corresponding cathodes define the pixel apertures 68 (FIG. 2). In one aspect of the invention, a constant voltage may be applied to the cathode 16 for a selected time (i.e., a display frame time period) to set the particles in one position or another position. In another aspect of the invention, a voltage to a corresponding cathode may be varied in accordance with a selected time modulation technique or a voltage modulation technique. For example, by placing a voltage on a cathode for selected periods of time over a display frame period, a select number of the particles will migrate from the cathode to the corresponding anode. As the number of time periods increases, while maintaining a constant voltage, an increased number of particles migrate to the anode. Similarly, by varying the voltage over the frame time or selected period of the frame time, by a voltage modulation technique, only some of the particles migrate to the corresponding anode. Hence, a gray scale display may be obtained, i.e., not all pigment particles remain on the cathode 16 or anode 18 with the appropriate application of a fixed voltage over the selected time or a varied voltage over the selected time. For example, U.S. Pat. No. 4,833,464, titled "Electrophoretic Information Display (EPID) Apparatus Employing Grey Scale Capability," which is assigned to the assignee herein, discloses a time based method for providing gray scale displays. Although, gray-scaling using time-modulation or voltage-modulation is typically associated with black-white EPIDs, it would be recognized that such modulation methods may be appropriately applied to each element of colored pixel (e.g., R, G, B) of a color display to create different levels of color from each element.

By applying a voltage for a selected number of short time intervals over a display frame period, a display is provided that results in the incomplete removal of pigment from an associated selected pixel. Hence, that pixel appears darker than surrounding pixels, but not as dark as a full application of the voltage over the display frame period. The amount of particles moved and, hence, the darkness of each pixel is a function of the time duration during which appropriate voltages are applied to the rows and columns of the TFT array. In this manner, a timing generator can cause different pixels to have different degrees of darkness or grey scale values by varying the time during which the voltage is applied to the display (time-modulation). It should be understood that a controller, including, for example, a computer, microprocessor and/or dedicated hardware (e.g., ASIC, FPGA) may be used to selectively apply a voltage or current to selected ones of the cathodes for selected time periods. Similarly, the controller may apply a varying voltage to the selected cathodes for a selected time (frame time) or subunits of the frame time.

Referring to FIG. 2, the display includes a plurality of pixels arranged in a matrix of rows 13a and columns 13b. Each pixel comprises a TFT transistor which is connected to a cathode 16 (pixel electrode). Additional electrodes of the TFT transistor are connected to the row 13a and column 13b electrodes of the associated pixel. During the updating of an image, an appropriate voltage (selection voltage) can be applied to any of the rows. When a row is selected, each column delivers a specific voltage to the pixel electrode located at the particular row and column intersection. The TFT serves as a voltage storage device, preserving the voltage at the pixel electrode, while the other rows in the matrix are being updated. The voltage that is applied to the pixel electrode (cathode) during the updating process (scanning process) relative to the anode electrode controls the back and forth movement of the charged electrophoretic particles between the anode electrode and the pixel electrode (cathode) for the respective pixel in the row and column matrix. It should be understood that a voltage source or current source may also be used to apply an appropriate voltage or current to the anode and TFT elements (or the cathode 16 directly) to achieve a potential difference between the anode and cathodes. For example, the voltage source may be a direct current source that generates a single or multiple voltages, or an alternating current source that is rectified to generate one or more direct current sources. The current source may be a direct current or alternating current source that provides appropriate voltage to the corresponding electrodes.

In addition, a controller (shown as a row controller and a column controller) may be incorporated to selectively apply a voltage (or current), from the illustrated voltage source, to selected TFTs in corresponding rows and columns of the TFT array. A suitable controller may be computer or microprocessor including code which directs the output of the voltage source to one or more selected rows and columns. Alternatively, the controller may be dedicated hardware (ASIC, FPGA) that directs the output of the voltage source to one or more selected rows and columns.

Referring back to FIG. 1A, when charged dark or black electrophoretic particles 22 are attracted to one or more anode electrodes 18, light is allowed to travel through the substantially clear, substantially particle free, electrophoretic suspension fluid 36 and is reflected off the reflective white electrode layer 28 on the back substrate 38 making a pixel appear white when viewed through viewing side 12 (FIG. 1) or pixel aperture 68 (FIG. 2). When the charged dark electrophoretic particles 22 are attracted to one or more transparent cathode electrodes 16, light is blocked, making the pixel appear black when viewed through pixel aperture 68. By moving back and forth from the walk formed by the anode electrodes 18, to and from the cathode electrodes 16, the electrophoretic particles 22 essentially act as a light shutter.

Advantageously, the one or more cells 60 formed by the walls of the anode electrodes 18, in conjunction with associated cathode electrodes 16, tend to isolate the electrophoretic pigment particles 22 from one another, thereby improving the electrical, colloidal, operational, and life-time stability of the EPID 100. Moreover, the cells 60 can be easily dimensioned to provide hundreds of pixels per inch, thereby enabling one to obtain extremely fine resolution, and to create high resolution display capabilities.

Since the anodes 18 in the form of walls are viewable through the viewing surface 12, the thickness of the walls should be kept to a minimum width to provide a maximum amount of usable viewing surface. In one aspect of the invention, the thickness of the anodes 18 may be determined as a function of the space between the TFT layer 10 and the inner surface of the back layer 38, including any additional layers disposed thereon. In one aspect of the invention, the thickness of the anode 18 may be selected to be proportional to the distance (space) between the substrates that form the cavity. For example, the thickness/space ratio may be approximately 1:10, or less to effectively reduce areas that would not otherwise be usable on the display.

Referring to FIG. 1B, there is shown another exemplary EPID 100 in accordance with an aspect of the invention. In this illustrated example, one or more walls 47 extending substantially perpendicular from the inner surface of layer 28 are disposed substantially opposite from the anodes 18 in the form of walls extending from the transparent substrate 10. In this illustrated aspect of the invention, which may be referred to as a split-wall configuration, walls 47 provide for further containment of the particles 22 in a corresponding cell. As illustrated, a gap 90' exists between the top surface of the anodes 18 and the lower edge of walls 47 to allow for the substantially uniform distribution of fluid 36 throughout the display.

According to an aspect of the invention, the layer 28 (FIGS. 1A and 1B) disposed on the inner surface 50 of the back substrate 38 may be formed of a conductive material. In this aspect, application of a voltage to layer 28 provides for initializing and/or resetting the display or the deposition of particles during the manufacturing process. Application of a voltage to an electrically conductive layer 28 further provides for the initial distribution of the electrophoretic dark or black pigment particles 22. In one aspect of the invention, the walls 47 may be formed of a material with conductive properties similar to that of layer 28, or may formed of a different material with different conductive (or non-conductive) properties. For example, walls 47 may be a non-conductive material when layer 28 is a conductive material.

The particles described herein are organic or inorganic particles suitable for use in electrophoretic displays. For example, the dark electrophoretic pigment particles 22 may include, but are not limited to: carbon black, carbon nanotubes, iron oxide black, lamp black, Zn—Fe—Cr brown Spinel, Magnesium Ferrite, green Spinel, chromium oxide Green, Indanthrone Blue, Ultramarine Blue Dioxazine Violet, Quinacridone Violet, Anthraquinoid Red, and Perylene Red. Light electrophoretic pigment particles 24 suitable for use in the EPIDs may include, but are not limited to: titanium dioxide, zinc oxide, silica, zinc sulfide, calcium silicate, alumina hydrate, Diarylide Yellow, Arylide Yellow, Diarylide Orange, and Perinone Orange.

Figure 3:
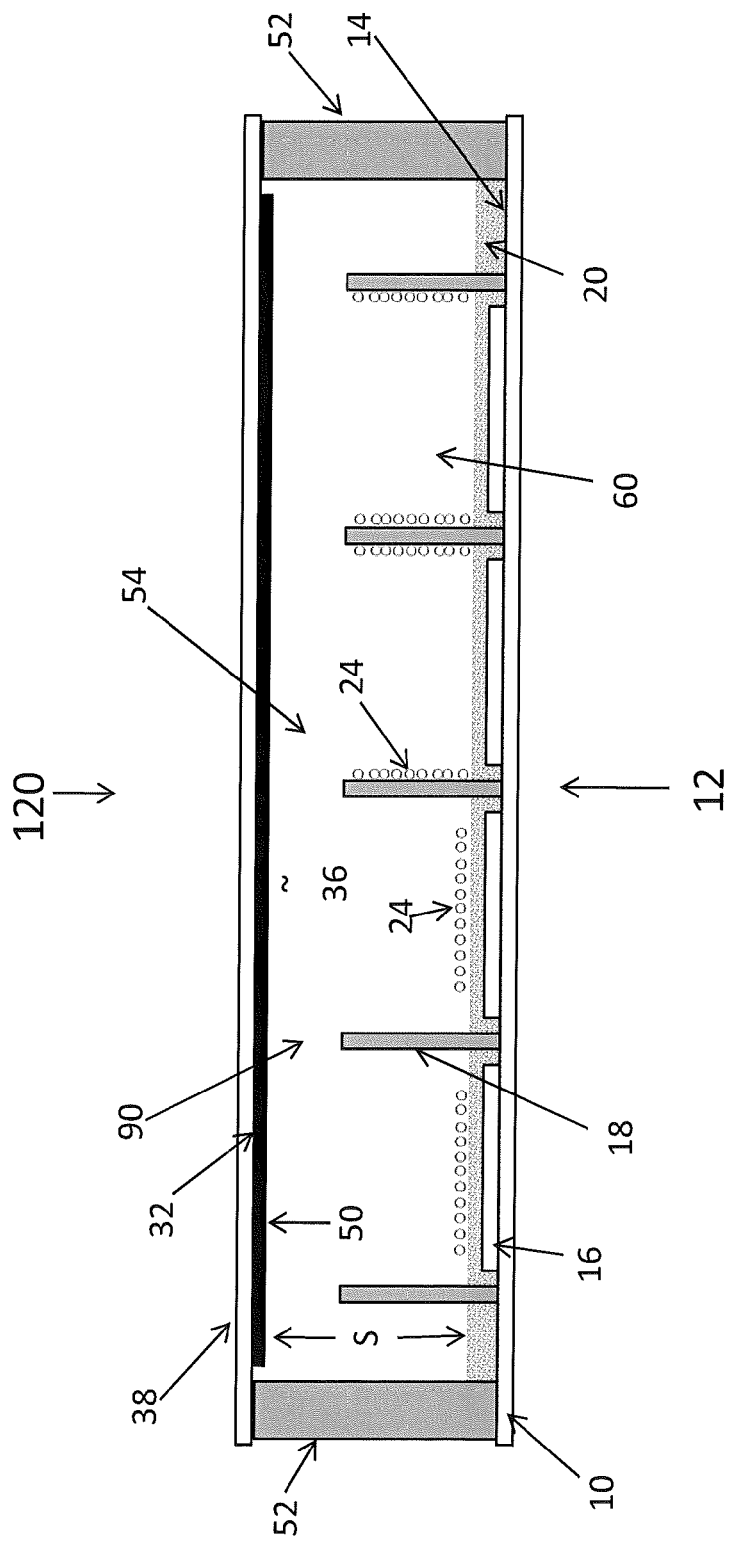
FIG. 3 illustrates a cross-sectional view of an EPID according to an aspect of the invention.

FIG. 3 illustrates an EPID 120, according to another aspect of the invention. In this aspect, a black electrode layer 32 is disposed on a back substrate 38, and the electrophoretic particles are reflective white particles 24. When the charged white reflective electrophoretic particles 24 are attracted to a side wall of an anode electrode 18 from an associated cathode 16, the pixel appears black when viewed through viewing surface 12 (the black electrode 32 is being viewed through the pixel aperture. Alternatively, when the charged reflective white particles 21 are attracted to the transparent cathode 16, the light is reflected off the surface of the white particles, making the pixel appear white when viewed through viewing surface 12.

It should be understood that the polarity of the white particles 24 is different than the polarity of the black particles 22 in FIGS. 1A and 1B, and thus, the polarity of the voltage difference required for the END illustrated in FIG. 3 is opposite from the voltage difference disclosed previously with regard to FIGS. 1A and 1B.

Figure 4:
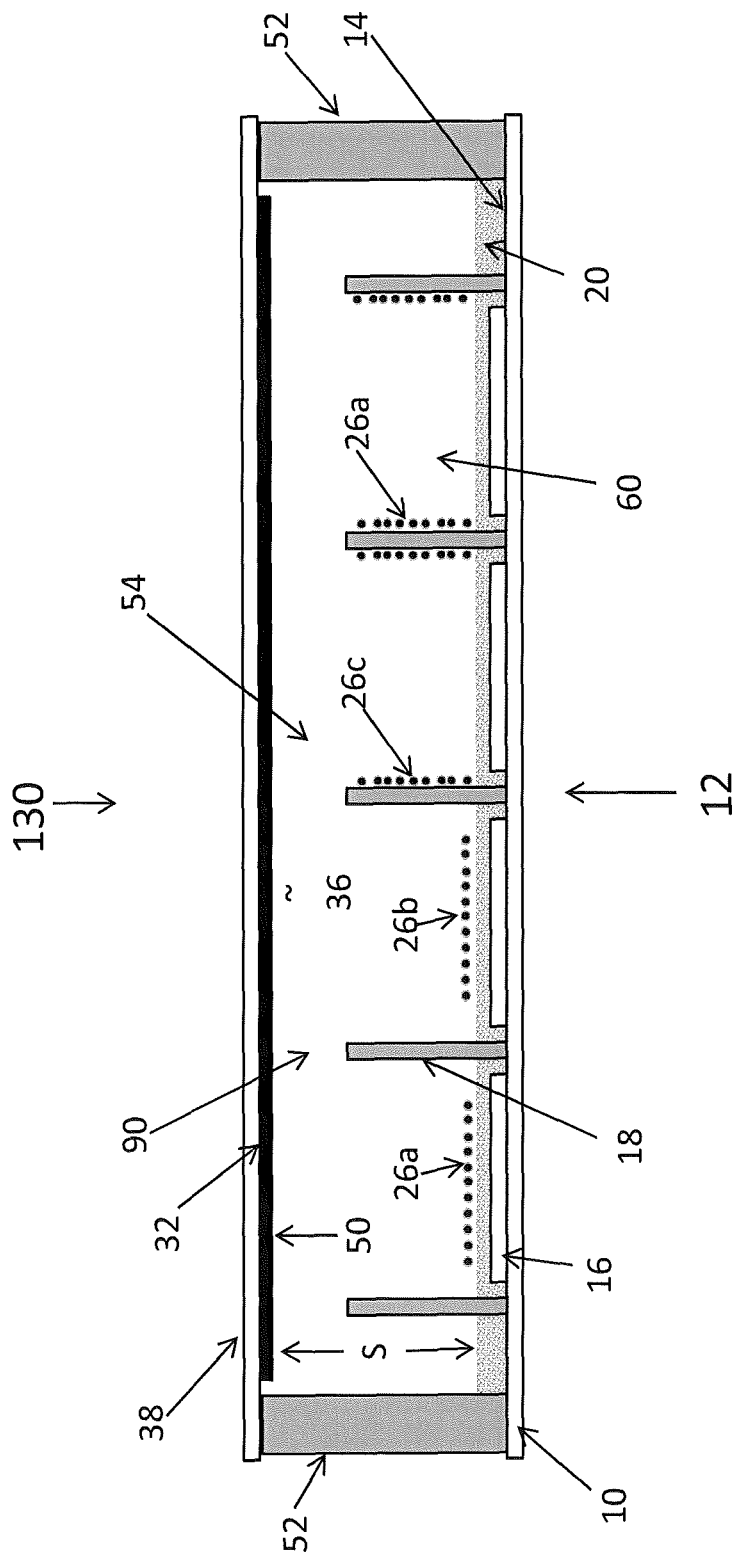
FIG. 4 illustrates a cross-sectional view of an EPID according to an aspect of the invention.

FIG. 4 illustrates an EPID 130 in accordance with another aspect of the invention. In this aspect, an opaque black electrode layer 32 is disposed on a back substrate 38. According to this aspect of the invention, the reflective electrophoretic particles 26a-c are colored particles. For example, the particles selected may be a particle that reflects a red color, reflects a green color, and reflects a blue color, respectively. It should be understood that the colors described herein are only for describing an aspect of the invention, and that particles of other colors may suitably be used.

The reflective electrophoretic particles 26a-c may be deposited on the TFT active matrix substrate 10 by a conventional electrophoretic deposition process. As illustrated, the reflective electrophoretic particles 26a-c are isolated and separated from one another within respective cells 60. When any of the charged electrophoretic particles 26a-c are attracted to a corresponding anode electrode 18 (wall) 18 from a corresponding cathode 16, the pixel appears black when viewed through viewing surface 12 (or pixel aperture 63 in FIG. 2), as the black electrode 32 is being viewed. However, when any of the colored particles 26a-c are attracted to the transparent cathode 16, the light is reflected off the surface of the particles, making the pixel appear the color of the particle, e.g., red, green or blue, when viewed through the respective pixel aperture 68.

It should be understood that the walls 47 (FIG. 1B) may be incorporated into the EPID illustrated in FIGS. 3 and 4 to provide for further containment of the particles 24 or 26a-c, respectively.

Figure 5A:
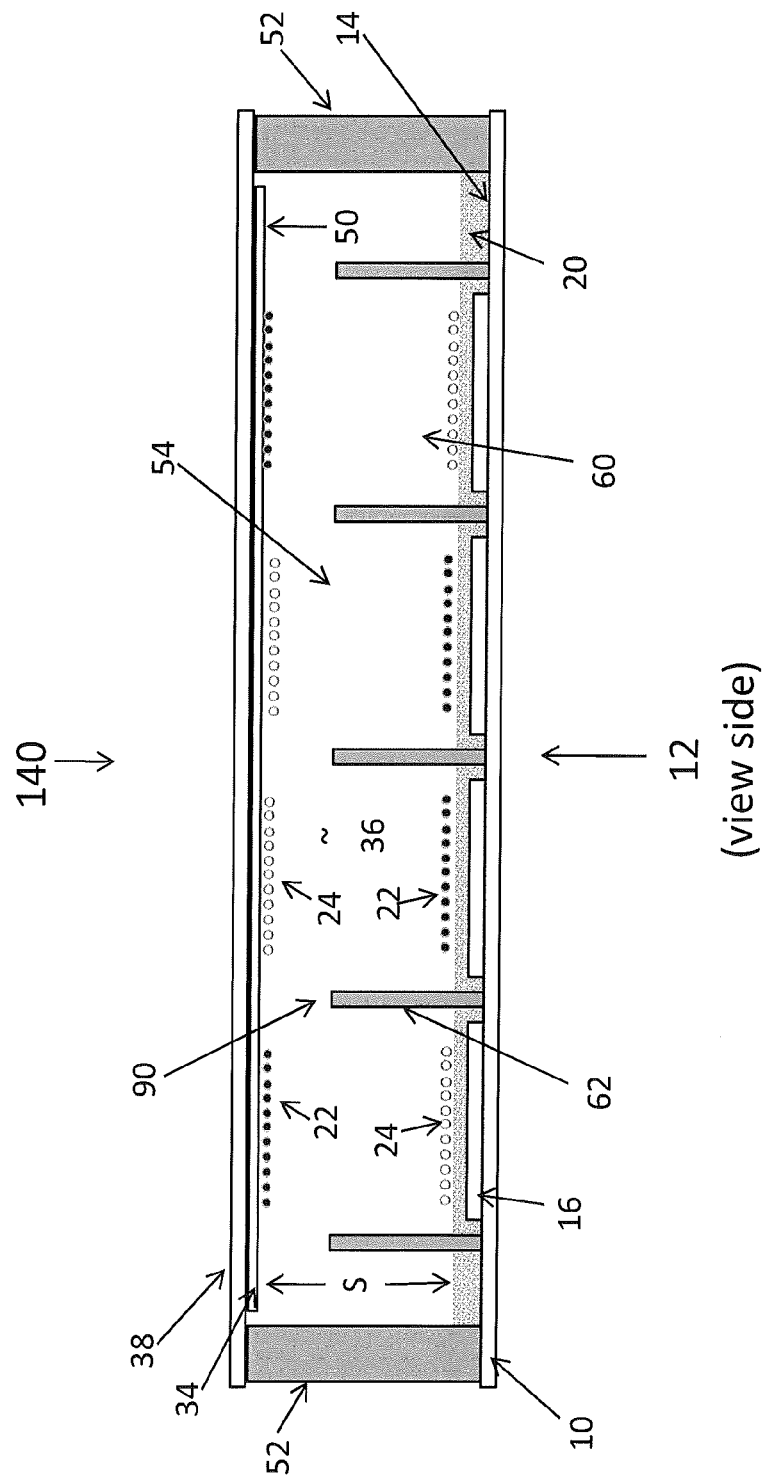
FIGS. 5A and 5B illustrate cross-sectional views of a dual-particle EPID according to an aspect of the invention.

FIG. 5A illustrates a cross-sectional view of an EPID 140 in accordance with another aspect of the invention. In this aspect, which may be referred to as a dual-particle EPID, a transparent cathode electrode 16 is disposed on the TFT substrate 10 and an anode electrode layer 34 is disposed on a back substrate 38. In addition, both dark (e.g. black) particles 22 and light (e.g., reflective white) particles 24 are deposited on respective opposing surfaces.

According to this aspect of the invention, for any given pixel, depending upon the respective voltages of the anode layer 34 and the transparent cathode 16, the reflective white particles 24 will be attracted to the cathode 16, and the black particles 22 to the anode layer 34 on the back substrate 38, making the pixel appear white, or alternatively, the black particles 22 will be attracted to the cathode 16, and the reflective white particles 24 to the anode layer 34 on the back substrate 38, making the pixel appear black.

In this aspect, the one or more separation walls 62, in conjunction with a cathode 16, form a cell 60. Still referring to FIG. 5A, the separation walls 62 are in the form of a frame or mesh surrounding each cathode electrode, as illustrated, or may surround a plurality of cathode electrodes, and are formed of a suitable material, for example, a non-conductive material, to contain particles within respective cells. The separation walls extend from the substrate 10 partially toward the electrode layer 34 but do not meet or touch the electrode layer 34. The opening or gap formed therebetween allows for fluid communication among the cells. It should be understood that walls 47 illustrated in FIG. 1B may also extend from the inner surface of electrode layer 34 to provide further containment of the particles 22, 24 within a corresponding cell. This split-wall design also provides a gap through which fluid 36 may be distributed among the cells. It should be understood that the separation walls may also be made of a conductive material to allow for a voltage to be applied to attract particles, as previously described.

Figure 5B:
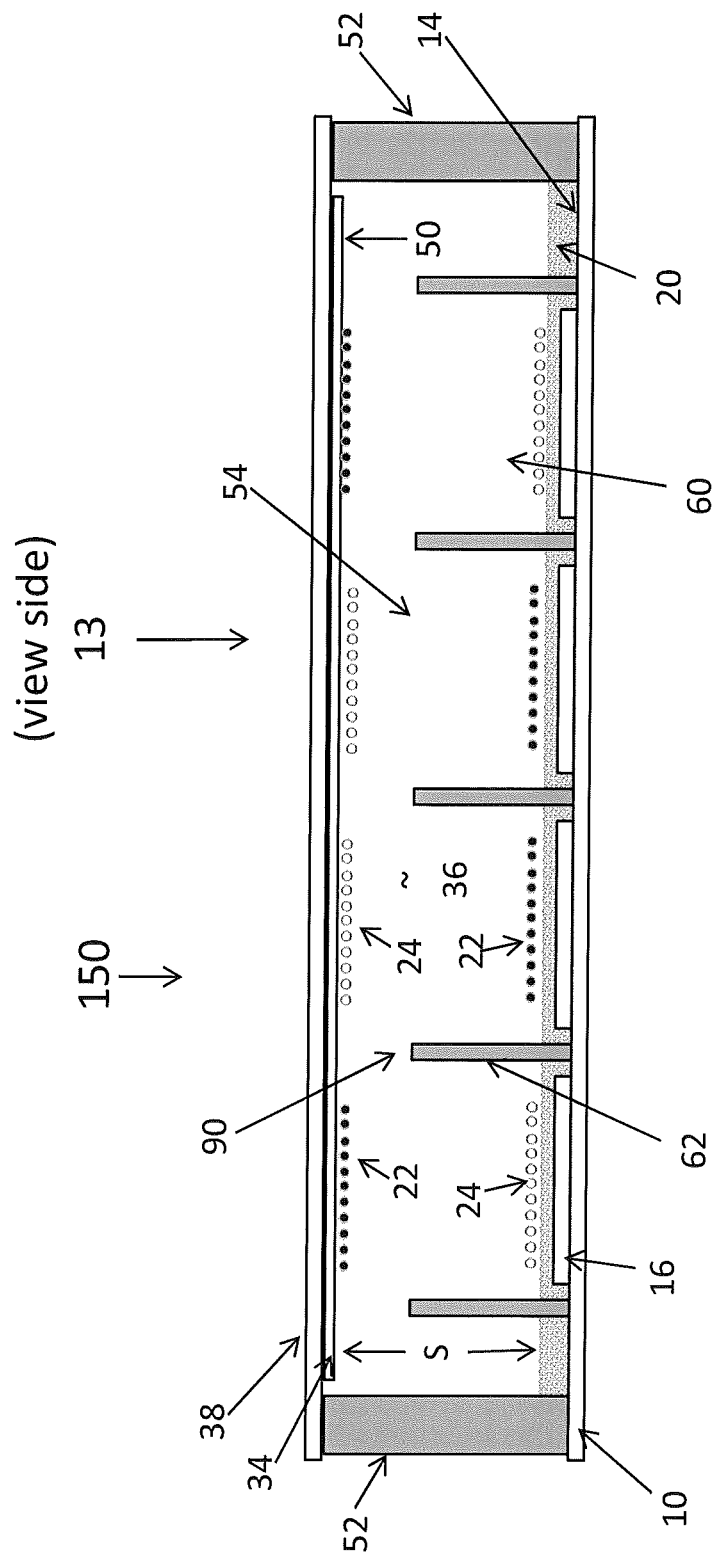

FIG. 5B illustrates a cross-sectional view of an EPID 150 in accordance with another aspect of the invention. In this aspect, on the viewing side 13 an anode electrode layer 34 is disposed on a back substrate 38 and a cathode layer 16 is deposited on a TFT layer 10, in which both black and reflective white particles, 22 and 24 are deposited on respective opposing surfaces. According to this aspect of the invention, for any given pixel, depending upon the respective voltages of the transparent anode layer 34 and cathode 16, the reflective white particles 24 will be attracted to the cathode 16, and the black particles 22 to the transparent anode layer 34 on the back substrate 38, making the pixel appear black. Alternatively, the black particles 22 will be attracted to the cathode 16, and the reflective white particles 24 to the transparent anode layer 34 on the back substrate 38, making the pixel appear white. In this aspect, the one or more separation walls 62, in conjunction with a cathode 16, form a cell 60. The separation walls are in the form of a frame or mesh surrounding each cathode electrode or a group of cathode electrodes, and are formed of a suitable nonconductive material, and are less than the height of space S to allow for the fluid communication between the walls as described previously.

Figure 6A:
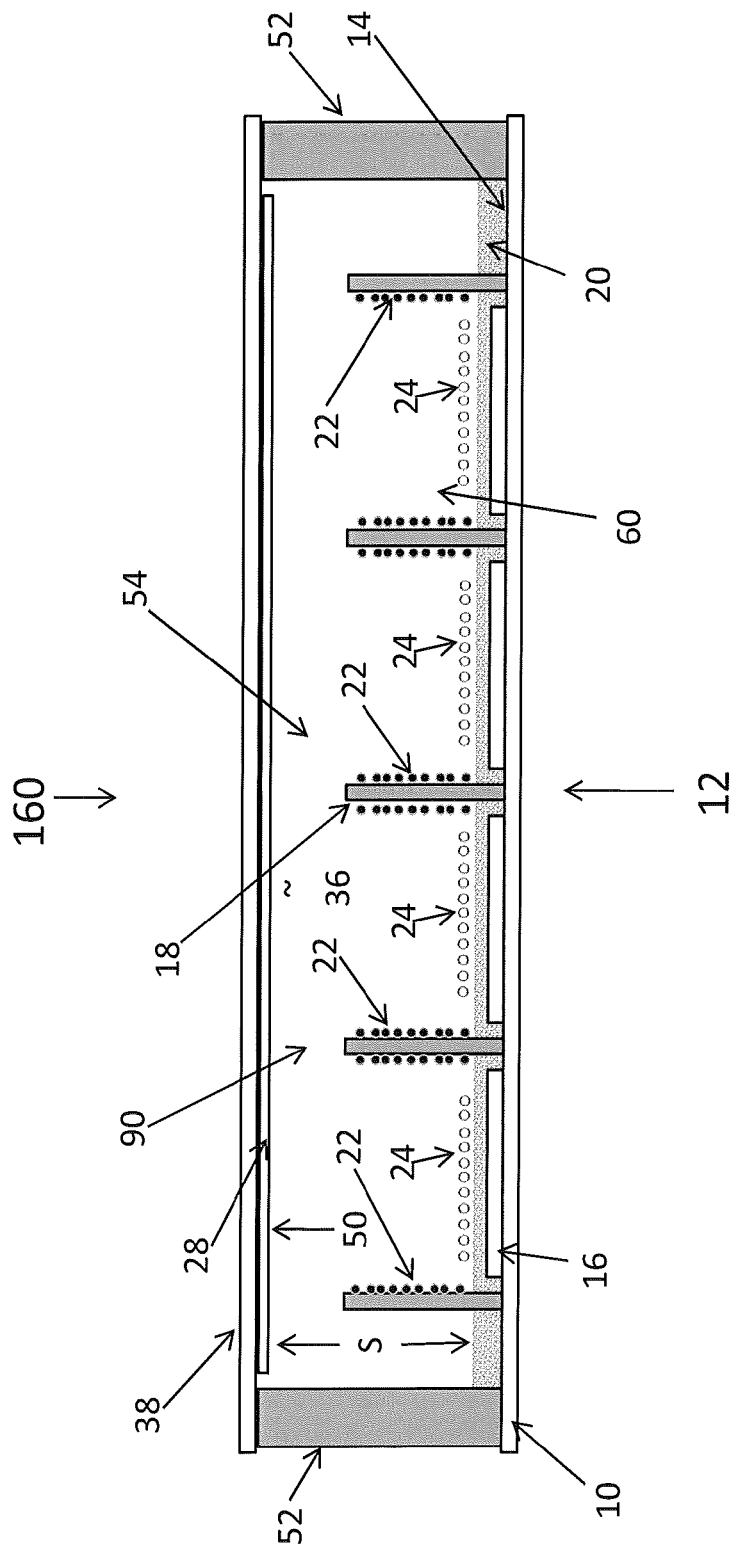
FIGS. 6A and 6B illustrate cross-sectional views of another aspect of a dual-particle EPID according to an aspect of the invention.
Figure 6B:
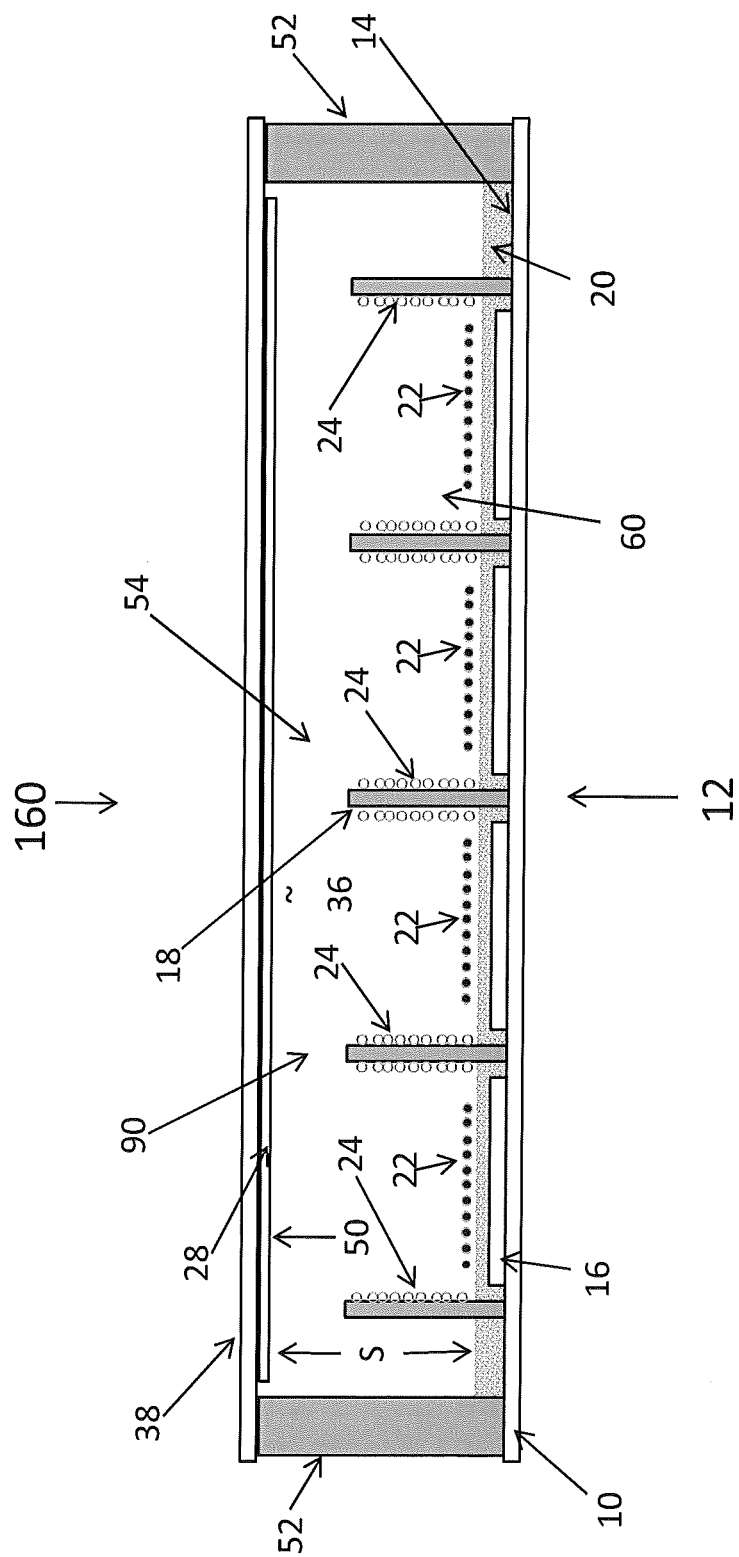

FIGS. 6A and 6B illustrate a cross-sectional view of another aspect of the invention including a dual-particle electrophoretic display.

According to this aspect, particles having two different electrical charges are included within each cell. The anode electrodes 18 are charged to a known voltage as previously described. When the voltage applied to the cathode 16, through the corresponding TFT circuit is less than the voltage on the anode 18, particles having a first electrical charge are attracted to the anode 18 (e.g., particles 22), while particles (e.g., 24) having a second electrical charge are attracted to the cathode 16 (FIG. 6A). When the voltage applied to the cathode 16 is greater than the voltage applied to the anode 18, then the particles having the second electrical charge (e.g., 24) are attracted to the anode 18, while the particles (e.g., 22) having the first electrical charge are attached to the cathode 16 (FIG. 6B). Thus, in the former case, the pixel would appear to have the color of the particles having the second electrical charge, while in the latter case, the pixel would appear to have the color of the particles having the first electrical charge. While the most dramatic effect occurs when the particles are selected to be black and white, wherein the pixel is either black or white, when viewed from either side, it should be understood that alternative operations may be performed using electrically charged particles with any combination of colors, ranging between fully reflective and fully absorptive.

Figure 7:
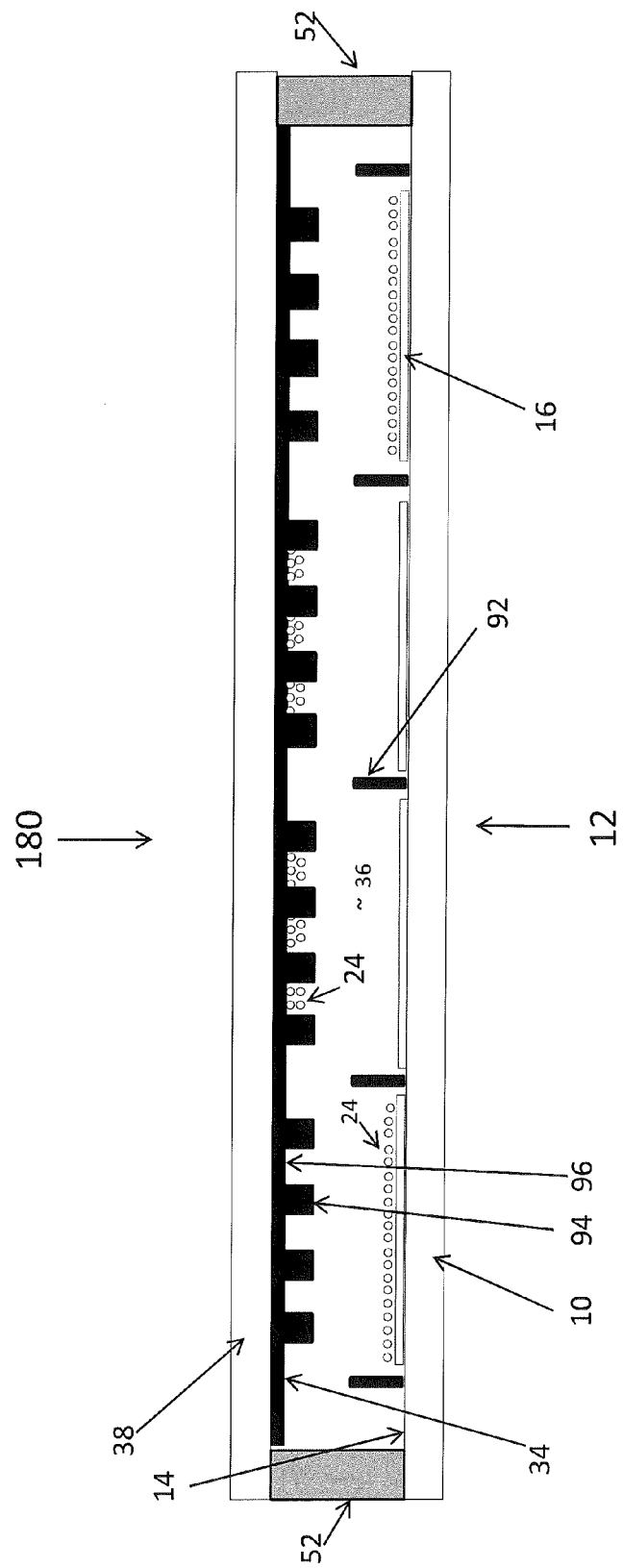
FIG. 7 illustrates a cross-sectional view of an EPID including cell particle containment wall according to an aspect of the invention.

FIG. 7 illustrates a cross-sectional view of an EPID 180 according to another aspect of the invention. The EPID 180 includes a TFT active matrix substrate 10, with a front viewing side 12, transparent cathode electrodes 16, and a plurality of pixel separation walls 92 disposed between and surrounding each cathode 16 for a group of cathodes 16). The cathode electrodes 16 and separation walls 92 are disposed on the inner surface 14 of the substrate 10. In this aspect, an insulation layer 20 is not used, as in FIG. 1A. It should be understood that insulation layer 20 may be optionally included in the EPIDs illustrated and described herein.

The EPID 180 includes a back substrate 38 with a dark anode electrode 34 disposed on the inner surface thereof. Disposed on the inner surface of the dark anode electrode 34 is a plurality of separation walls 94. The separation walls 94 are contained within the projection of the separation walls 92 onto the back electrode. In this aspect, white electrophoretic particles 24 may be suspended in a clear electrophoretic suspension fluid 36, or may be deposited, prior to sealing the TFT active matrix substrate 10 and the back substrate 38, on the TFT substrate 10 or the back substrate 38 by conventional electrophoretic deposition processes. The EPID may then be filled with a clear, substantially particle-free electrophoretic suspension fluid 36 after sealing the TFT active matrix substrate 10 and the back substrate 38 together.

The cathode electrodes 15 are separated from one another by the separation walls 92 that extend in a substantially perpendicular direction from the TFT active matrix substrate 10. Pixel separation walls 92 are in the form of a mesh-like structure. The separation walls 94 disposed on the dark anode electrode 34 surround and cross each cathode electrode 16 within a respective pixel area. Between two adjacent walls 94 are wells 96 that contain and hide the white particles 24. When the reflective white particles 24 are attracted to the anode 34, the particles 24 are contained within the wells 96 and the respective pixel appears dark (the color of the walls 94). When the reflective white particles 24 are attracted to the cathode 15, the respective pixel appears white. The separation walks 94 are advantageous as they provide wells 96 for containment of the particles within the pixel. In addition, it should be understood that walls 47 illustrated in FIG. 1B may also be incorporated into the EPID 180 to provide for further containment of the particles within the cell.

According to another aspect of the invention, a method for manufacturing the EPIDs herein is described and illustrated The method includes, prior to the step of sealing the TFT active matrix substrate 10 and the back substrate 38 about the perimeters thereof and filling the sealed container or cavity with a substantially clear, substantially particle-free, electrophoretic suspension fluid 36, a plurality of electrophoretic particles 22 may be deposited on the TFT substrate 10 or the back substrate 38 by conventional electrophoretic deposition processes. This is accomplished because the height of the anode electrode 18 is less than the height of the space S which forms a gap therebetween to allow the clear electrophoretic suspension fluid 36 to be added in an efficient manner. The gap provides for fluid communication among cells. In one aspect of the invention, the height of the space S may be approximately 10 um and the anode height may be approximately 7 um. The differences in height provides a sufficient gap so that in instances were the particles are deposited prior to filling with the electrophoretic suspension fluid, the cavity or follow EPID can be easily filled with the electrophoretic suspension fluid with the aid of a partial vacuum. A voltage may be applied to the substrate(s) during the deposition of the particles using conventional electrophoretic deposition techniques to maintain the particles in place. In addition, during the filling process, a voltage may be re-applied to maintain the deposited particles in place as the fluid is being added to the cavity between the first and second substrates.

The manufacturing of EPIDs is disclosed in U.S. Pat. No. 5,279,511, titled "Method of Filling an Electrophoretic Display," which issued Jan. 18, 1994, and is assigned to Copy-Tele, Inc. In this patent, two electrode plates separated by spacers create a cavity in which a fluid contain electrophoretic particles are dispersed. A voltage difference is applied to the electrodes to create an electrophoretic effect to collect the particles at one electrode or the other. The particular electrode to which the particles collect is determined by the particle charge and the voltage difference. Thereafter, the fluid is drained, the device is then disassembled to enable the particles to dry in place and then the device is reassembled. A clear suspension fluid is then introduced into the assembled EPID. The process has been found to be both time consuming and costly as the step of disassembling and drying are additional steps that increase the cost and the amount of time to fabricate the EPID.

In accordance with an aspect the invention, electrophoretic particles are deposited on an electrode plate (substrate) by the application of a voltage to the plate and then the plate is combined with a second substrate to create a cavity between the two plates. In this case, the voltage applied to the plate may be maintained or may be removed during the assembly process.

The cavity formed between the two plates may be void of any structure or may include structure with cells that are formed with side walls extending substantially perpendicular from one of the electrodes so as to form a gap between the top of the side wall and the opposing plate (electrode) (FIG. 1A) or the cells may be constructed using a split gap side wall (FIG. 1B). After sealing the cavity formed by the first and second plates (substrates) about the perimeter, a voltage difference is then maintained between the two plates to retain the deposited particles in place. A partial vacuum (i.e., a desired level of vacuum) is then created within the cavity by drawing the enclosed air out using conventional methods of evacuation. A clear suspension fluid is then injected, or drawn, into the partially evacuated cavity. In one aspect the fluid may be injected under pressure into the cavity. In another aspect the fluid may be drawn into the cavity by a combination of the created partial vacuum and capillary action.

With the gap created between the cell side walls and the opposing plate, the clear suspension fluid may be distributed through the cavity. In addition, the applied voltage difference during the filling process causes the deposited particles to remain in place. Hence, a more uniform distribution of particles and suspension fluid is achieved, as the particle placement is not disturbed as the suspension fluid occupies the unfilled space within the cavity. In another aspect of the invention, the filling process may be performed without the application of a voltage. In this case, the particles may be held in place by Vanderwaal forces.

In another aspect of the invention, the air may be evacuated from the cavity while the suspension fluid is concurrently injected or drawn. In this case, the rate of injecting the fluid must be more accurately controlled to avoid the fluid being drawn out by the evacuating process.

Figure 8:
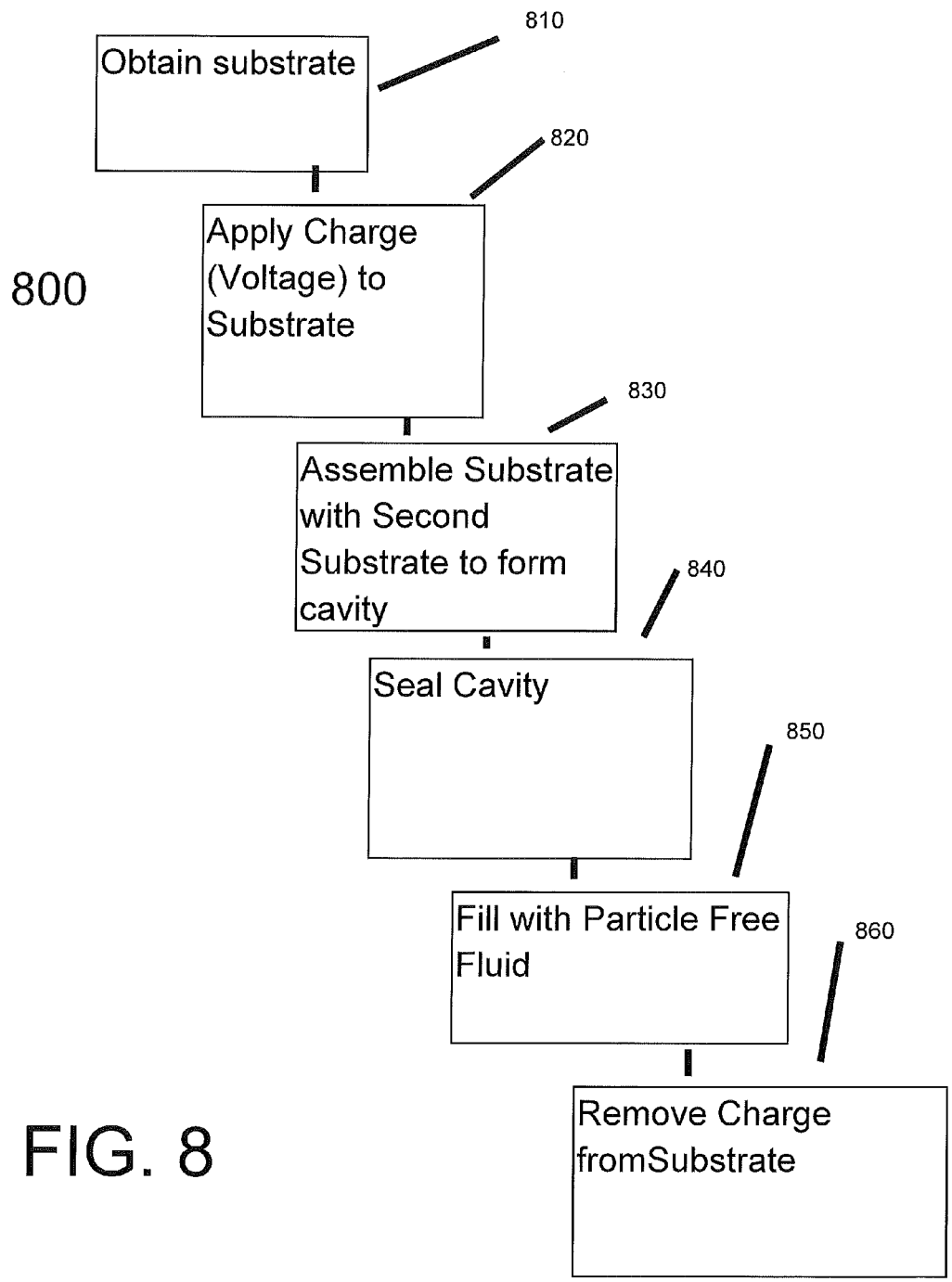
FIG. 8 illustrates a flowchart of a first method of manufacturing an EPID according to an aspect of the invention.

FIG. 8 illustrates a flow chart 800 of an exemplary manufacturing process in accordance with a first aspect of the invention. In this aspect, a single particle EPID is fabricated (e.g., FIG. 1A, 1B). At step 810, an electrically conductive plate or substrate) is placed on a holder. At step 820, in one aspect of the invention, a voltage is applied to the plate as a fluid containing electrophoretic particles contacts the plate. The voltage causes the particles to be deposited, and be retained, on the surface to the plate. It should be understood that the voltage used depends on the electrical charge of particles that are being deposited on the plate or substrate.

At step 830, the plate having particles deposited thereon is assembled with, but separated from, a second plate to form a cavity therebetween. The two plates may be separated by spacers to maintain a desired distance between the two plates (i.e., substrates). The spacers may be formed of a non-conductive material. Alternatively, the spacers may be formed of a conductive material that is electrically isolated from the electrically conductive elements on one or both of the plates.

At step 840, the cavity is sealed and the air in the sealed cavity is withdrawn. At step 850, a voltage may then be applied to the substrate to maintain the deposited particles in place as a clear suspension fluid is injected, or drawn, into the evacuated cavity. At step 860, the applied voltage may be removed.

Figure 9:
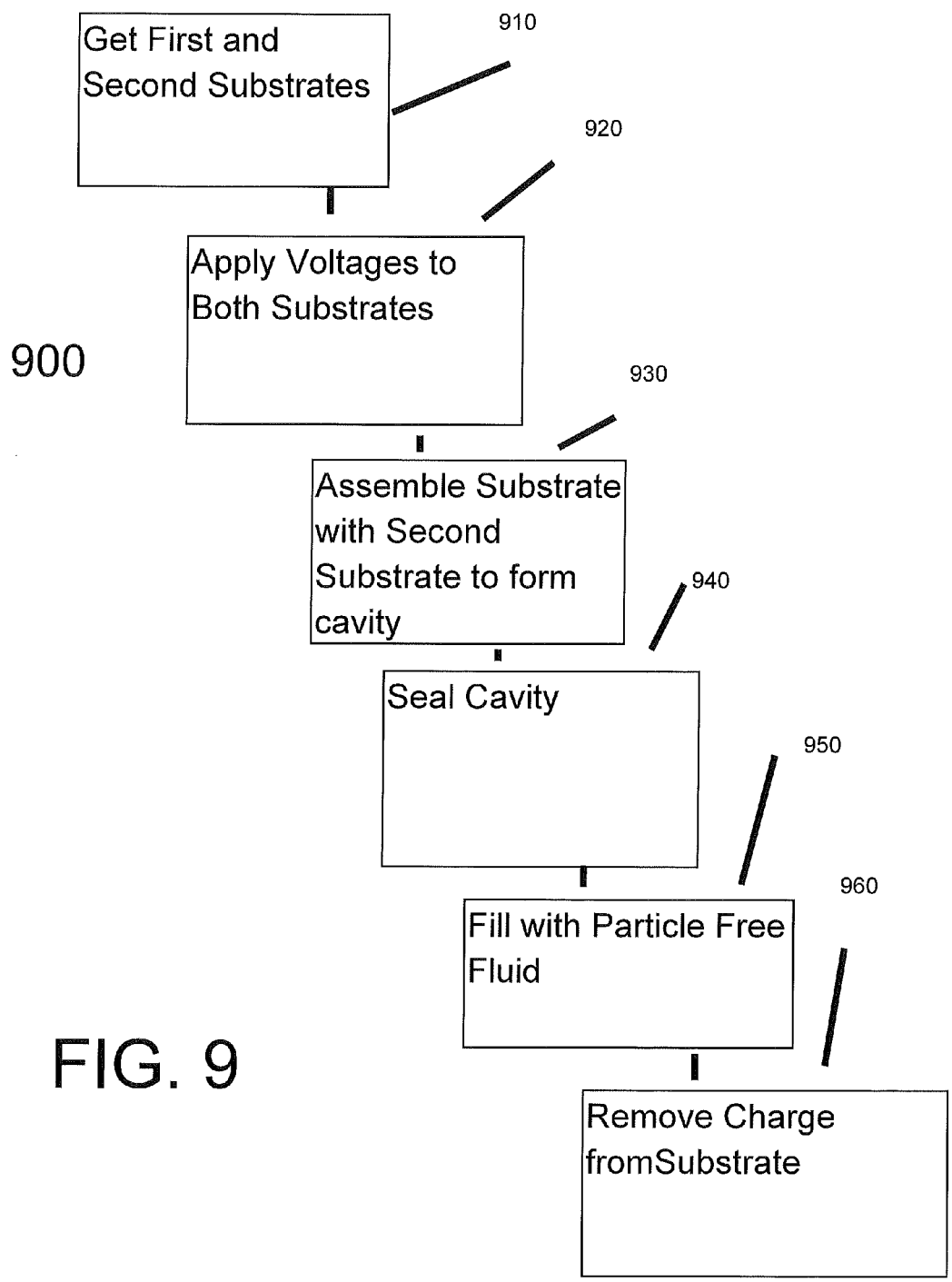
FIG. 9 illustrates a second method of manufacturing an EPID according to an aspect of the invention.

FIG. 9 illustrates a flow chart 900 of an exemplary manufacturing process in accordance with another aspect of the invention. In this aspect of the invention, a dual-particle EPID (e.g., FIGS. 5a-5b and 6a-6b) is fabricated. At step 910, an appropriate voltage is applied to each of electrically conductive plates that are to be used as the substrates of the EPID in a manner as described with regard to step 810. At step 920, electrically charged particles are attached to corresponding ones of the electrically charged plates. Steps 930-960 are similar to the steps 830-860 and, need not be further described.

The advantages of the EPID presented herein are:

1. The incorporation of a TFT substrate for rapid scanning operation. This allows for high resolution gray scale images with a very fast response time.

2. The partial walls that separate the pixel cells allow the EPID to be filled very efficiently. This is because the electrophoretic particles can be deposited on the surface of the substrates prior to filling. Therefore when filling the EPID only a substantially particle free electrophoretic fluid needs to be added. This can be done because all the cells are in fluid communication with one another. As the particle free electrophoretic fluid is not viscous, only a small gap is necessary. The small gap between the opposite electrode results in lower operating voltages (because of the relatively higher electric fields), and a short distance between the anode and cathode electrodes. This short distance translates into a fast response time because of the higher electric field and the shorter distance that the particles travel.

3. Since the separation walls are not very high they need not be very wide. This allows for a very high contrast because very little of the pixel area is wasted on the cell separation walls.

4. The separation walls also help contain the particles in a respective pixel cell. The particle containment may be further enhanced if there are partial separation walk on both the anode and cathode substrates.

Figure 10:
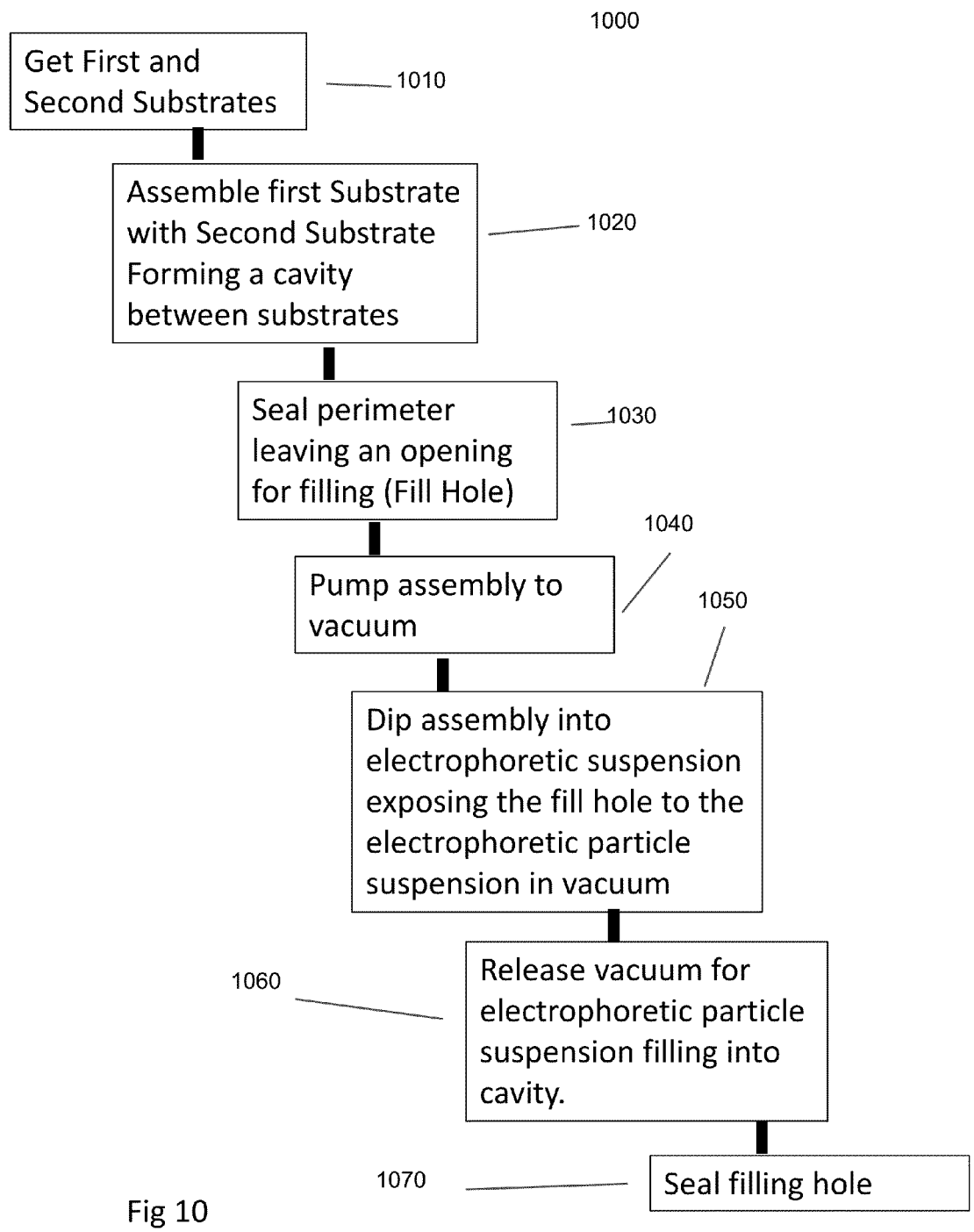
FIGS. 10-12 illustrate flow charts of further exemplary methods of manufacturing an EPID in accordance with the principles of the invention.
Figure 11:
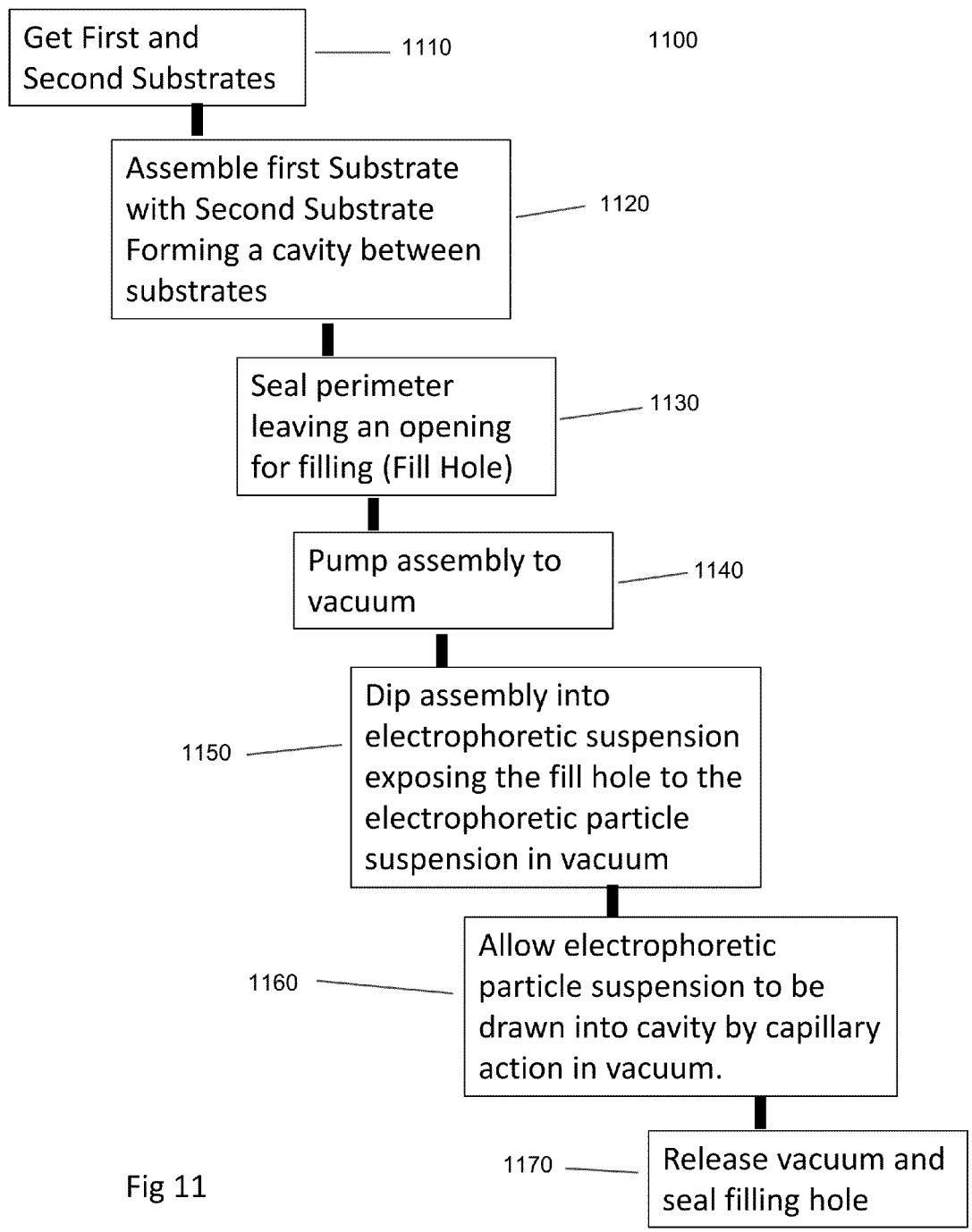
Figure 12:
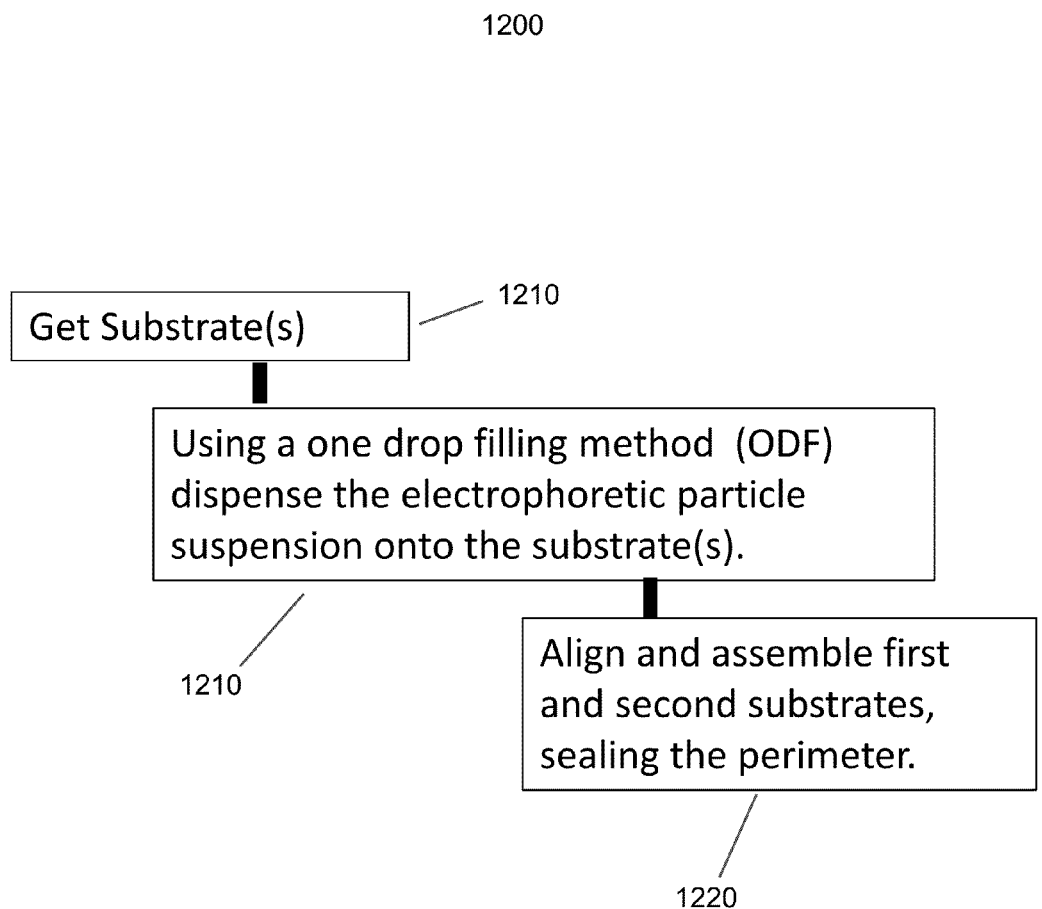

FIGS. 10-12 illustrate further aspects of manufacturing an electrophoretic display in accordance with the principles of the invention.

Referring to FIG. 10, there is shown a manufacturing process of an electrophoretic display wherein each of the first and second substrate includes a plurality of vertical (or perpendicular) walls, block 1010, that extend from the corresponding substrate, as previously described. The length of the vertical walls is such that when the first and second substrates are assembled (joined together) to form a cavity therebetween (block 1020). As would be appreciated, the vertical walls on the first and second substrates may be aligned, to form cells within the cavity, and, thus, the length of the vertical walls is smaller than the length of the cavity so that a gap may be formed between the tops of the walls projecting up from a bottom substrate and extending down from a top substrate. In another aspect of the invention, the vertical walls extending from the first and second substrates may be offset from one another and in this case, the vertical walls may be longer than in the embodiment of the invention when the walls are aligned. However, the length of the vertical walls also remains less than a length of the cavity formed between the first and second substrate such that a gap is formed between a top edge of a vertical wall on one substrate and a bottom or inner surface of the oppositely positioned substrate. It should be noted that this assembly could also be configured with the vertical (or perpendicular) walls only on one of the two substrates.

At step 1030, a perimeter of the assembled first and second substrate is sealed leaving a fill hole in the perimeter. At step 1040, the assembled first and second substrate is evacuated to form a vacuum within the cavity. At step 1050 the assembled first and second substrate is dipped into an electrophoretic suspension to cause the electrophoretic suspension (i.e., fluid) to be partially drawn into the cavity. At block 1060, the vacuum within the cavity is released and the electrophoretic suspension is further drawn into the partially filled cavity by the change in pressure that results from releasing the vacuum. At block 1070, the fill hole is then closed and the cavity is a sealed entity including the electrophoretic suspension.

FIG. 11 illustrates a second method for manufacturing an electrophoretic display in accordance with the principles of the invention. The process shown in FIG. 11 is similar to that shown in FIG. 10 and corresponding steps between the two processes need not be described in detail again. However, as referred to with regard to step 1050, step 1160 allows the filing of the cavity between the first and second substrates by capillary action. At step 1170, the vacuum is released and the fill hole is sealed to lock the electrophoretic particles and fluid within the cavity.

FIG. 12 illustrates a further method for manufacturing an electrophoretic display in accordance with the principles of the invention. In this embodiment of the invention, the first and second substrates obtained, block 1210. At block 1210 a One Drop Filling Method is then employed to dispense an electrophoretic particle suspension onto at least one of the substrates. The One Drop Filling Method is known in the art and need not be discussed in detail, herein. At block 1220 the first and second substrates, at least one containing an electrophoretic suspension, are assembled, as previously discussed (see block 1010) and the perimeter of the assembled first and second substrates is sealed to lock the electrophoretic suspension within the cavity formed between the first and second substrates.

As would be appreciated, the size of the gap may be dependent upon the method of manufacture of the electrophoretic display and a characteristic or property of the electrophoretic suspension used. For example, when a substantially particle-free fluid is the medium filling the cavity, then the gap may be smaller than a smallest particle size (see FIGS. 8 and 9), in this case, the substantially particle-free fluid may flow through a minimum gap, thus, providing significant containment of electrophoretic particles within each cell, in another aspect, when the electrophoretic suspension includes electrophoretic particles, then the gap size must be sufficiently large to allow a largest electrophoretic particle to pass through the gap. In this case, as the electrophoretic suspension, which contains particles, must flow throughout the cavity, then the particles within the suspension will be drawn into each of the cells. In this aspect of the invention, the size of the electrophoretic particles is used to determine a size of the gap created by the vertical walls extending from one layer and an inner or lower surface of an opposing substrate.

Figure 13:
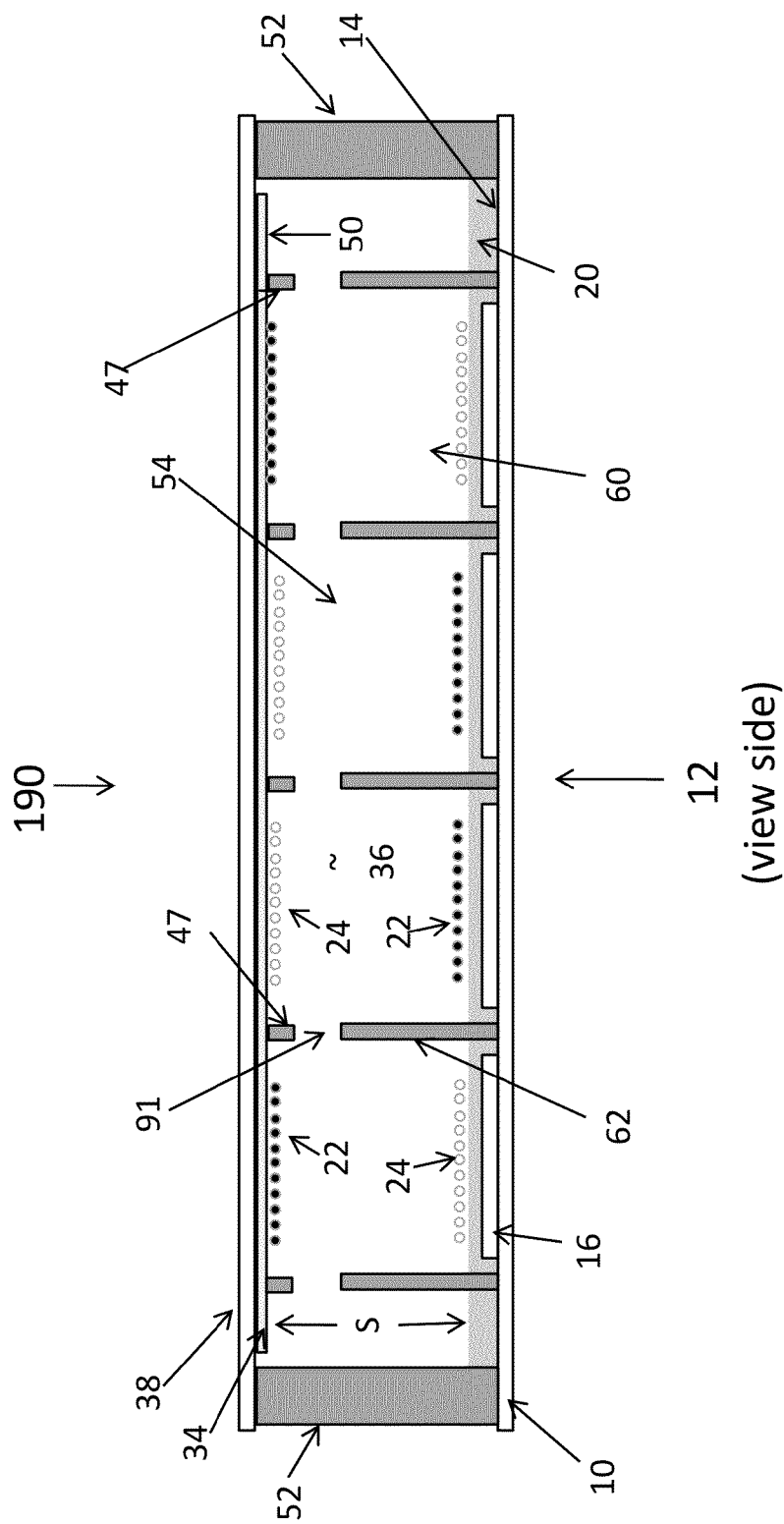
FIGS. 13-16 illustrate cross-sections view of an EPID including cell particle containment walls according to aspects of the invention.

FIG. 13 illustrates a cross-sectional view of EPID 190 incorporating the principles of the invention wherein vertical (i.e., substantially perpendicular) walls 47, 62 extend from each of a substrate 10 (i.e., cathode layer 16) and a back layer 38. The substantially perpendicular walls 47, 62 are aligned such that a gap 91 is formed between the edges of the walls. FIG. 13 is similar to the EPID shown in FIGS. 1B, 5A, for example, and a detailed discussion of the elements shown in FIG. 13 need not be repeated in full, again, as the elements shown in FIG. 13 may be readily understood by those skilled in the art with reference to FIGS. 1B, 5A, for example.

As discussed previously, the gap 91 may be sized dependent upon the characteristics of the electrophoretic suspension wherein when the electrophoretic suspension is substantially particle free then the gap 91 is sized to limit transfer of particles between the cells. However, when the electrophoretic suspension includes particles, then gap 91 is sized to allow the largest electrophoretic particle within the electrophoretic suspension to flow from one cell to another.

FIG. 13 illustrates a case wherein the viewing 12 is performed through a transparent substrate 10 containing a cathode layer 16.

Figure 14:
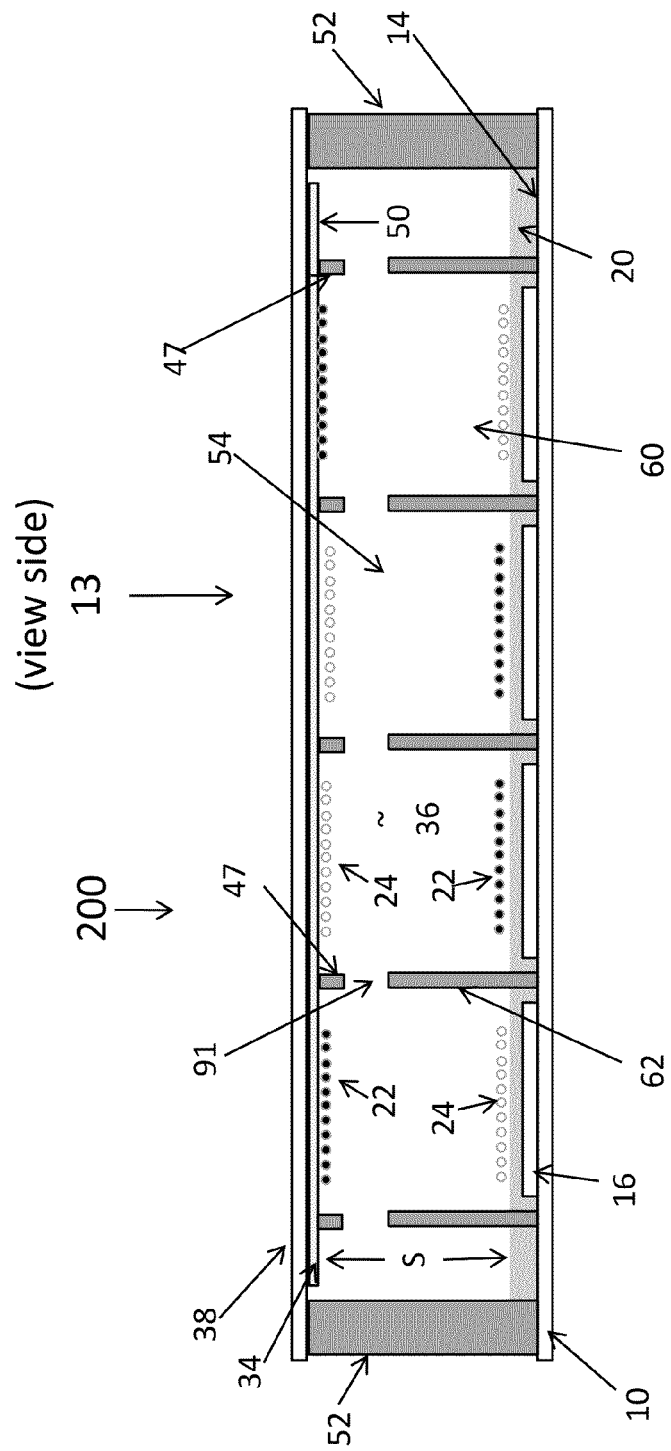

FIG. 14 illustrates an EPID 200 similar to that of FIG. 13, wherein the viewing 13 is performed through a transparent layer 38. The elements of FIG. 14 are similar to those of FIG. 13 and, hence, need not be discussed in further detail, herein.

Figure 15:
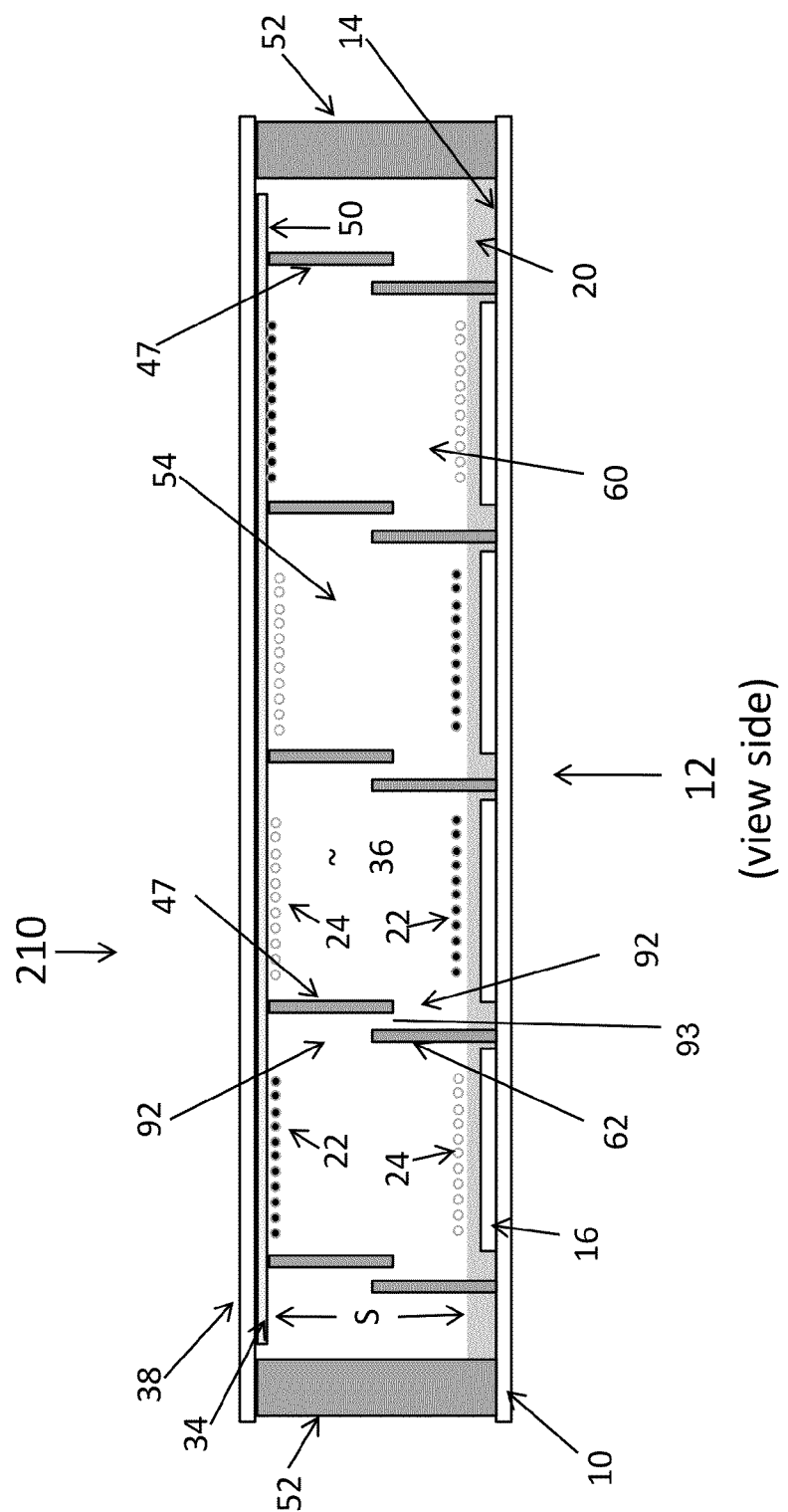

FIG. 15 illustrates a cross sectional view of another aspect of an electrophoretic display in accordance with the principles of the invention. In this illustrated example, which contains elements similar to those of FIG. 13 (and FIGS. 1B, 5A) and need not be described again in detail, the substantially vertical (i.e., perpendicular) walls 47, 62, extend from corresponding ones of the cathode 16 and back layers 38 and are offset from one another. In this illustrative case, a gap 92 is formed between a top edge of a vertical wall and a lower surface of an opposing layer. It would be recognized that a length of the vertical wall may be adjusted such that size of gap 92 determined based on a characteristic (or property) of the electrophoretic suspension, as previously discussed.

In addition, the offset between the vertical walls 47, 62 forms a gap 93 between vertical walls 47, 62. The size of gap 93 is, as previously discussed, based on a property of the electrophoretic suspension, such that the electrophoretic particles within the electrophoretic suspension may flow between the cells.

FIG. 15 illustrates a case wherein the viewing 12 is performed through a transparent substrate 10 containing a cathode layer 16.

Figure 16:
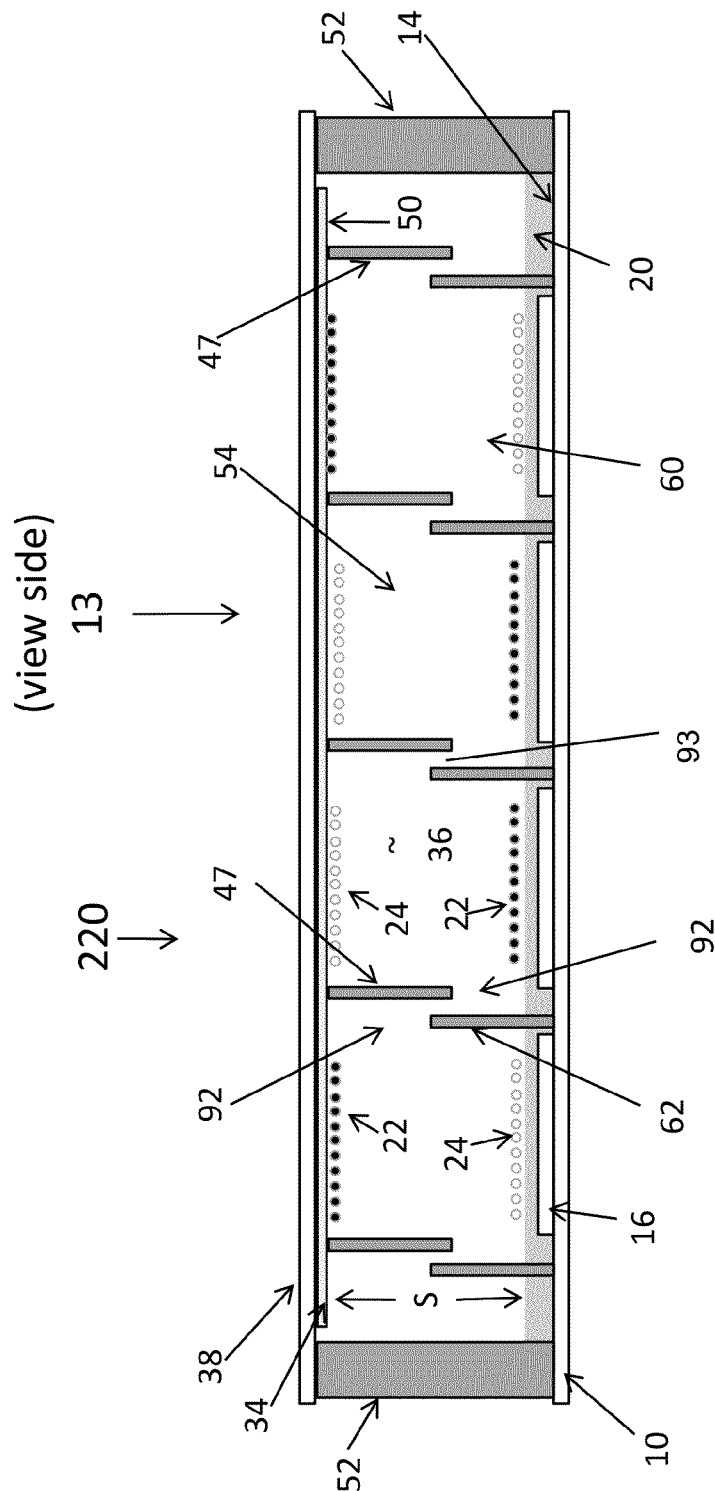

FIG. 16 illustrates an EPID 210 similar to that of FIG. 15, wherein the viewing 13 is performed through a transparent layer 38. The elements of FIG. 15 are similar to those of FIG. 14 and, hence, need not be discussed in further detail, herein.

As shown herein, electrophoretic displays can contain two contrasting color particle groups associated with each pixel cell. For example one group could be black and the second group could be white. Other examples are Black and Red, Black and Green or Black and Blue. When two contrasting color groups of particles are associated with a pixel cell they are usually of opposite electrical charge. Therefore when forming a gray scale image when a portion of one of the color groups move in one direction based on the gray scale level (either away from or toward the viewing side of the display) an approximate portion of the oppositely charge color contrasting particles moves in the opposite direction. This allows for the formation of gray scale images with improved color contrast.

As previously discussed, electrophoretic displays may use time modulation and/or voltage modulation to achieve gray scale. When using time modulation images are created over N−1 sub-frames of a display frame where N is equal to the number of Gray Scales, wherein a voltage is applied to alter the orientation of the particles within a cell to one or more (i.e., 1 to (N−1)) sub-frames of the display frame. The total time duration of all the N−1 sub-frames is the time that is necessary for all of the electrophoretic particles of a selected pixel to reach its destination electrode when an associated voltage is applied between the electrodes of a selected pixel.

In order to display gray scale images it is necessary to be able to move only a portion of the electrophoretic particles of a selected pixel during each of the N−1 sub-frames.

In one aspect of the invention, movement of the particles is accomplished by applying a voltage, which causes the electrophoretic particles to move to its destination electrode, during those time slots (or sub-frames) in the latter portion of the N−1 sub-frames. For example if the number of sub frames is 15 (i.e., N=16 gray scale levels from 0 to 15), may be achieved.

To move all the electrophoretic particles (gray scale 15) for a selected pixel it is necessary to apply an associated voltage to the electrodes of a selected pixel for each of the 15 sub frames of the display frame. However if a gray scale value of 3, for example, is required, (hence, only 20% of the electrophoretic particles of a selected pixel are to be moved to the viewing surface), then a voltage is applied to the electrodes of the selected pixel for 3 sub-frames. In one aspect of the invention, the voltage is applied to the electrodes of the selected pixel for the latter 3 sub frames of the display frame. That is, the voltage is applied to the electrodes of the selected pixel in the last three sub-frames as measured from the end of the display frame. In accordance with the principles of the invention, the method of driving an electrophoretic display in sub-frames measured from the end of the display frame results in removal of the voltage necessary to move the electrophoretic particles for all the selected pixels simultaneously (i.e., at the end of the display frame) regardless of their respective gray scale.

Although, the timing relationship described herein has been explained with regard to gray scale (i.e., black/white particles) it would be recognized that the same technique may be applied to color displays wherein pixels are composed of cells (or pixels) comprising red and black particles, blue and black particles and green and black particles, for example. It would be recognized that the pixels or cells may have red and white or blue and white or green and white particles without altering the scope of the invention.

Figure 17:
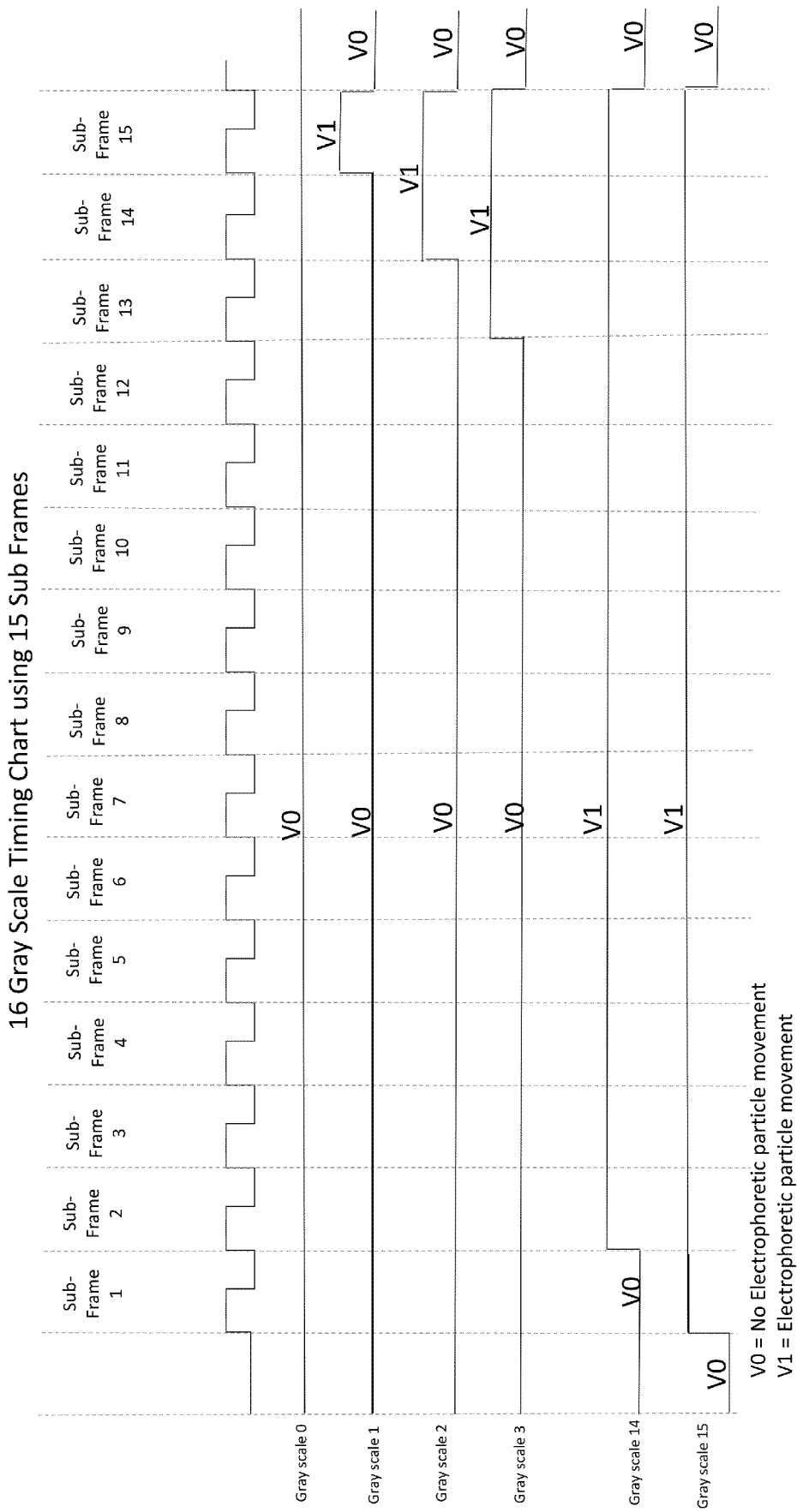
FIGS. 17 and 18 illustrates exemplary timing charts in accordance with the principles of the invention.

In accordance with the principles of the invention, a voltage may be applied to each of the red, blue, green cells that form a pixel to create a desired image with individually controlled red, blue, green or black values. By ending the application of the voltage to each of the individual colors cells (pixels), the application of the voltage to each of the individual color cells is ended at the same time, Hence, more uniform color image in the pixel is created as there is less particle drift FIG. 17 illustrates an exemplary timing diagram wherein a voltage V1 is applied to a corresponding pixel (or color cell) for different periods of time. In accordance with the principles of the invention, particles are moved away from the viewing surface when voltage V1 is applied to a corresponding cell (pixel). Alternatively, in accordance with the principles of the invention, particles may be moved to the viewing surface when voltage V1 is applied to a corresponding cell (pixel). It would be recognized that movement of the particles away from or toward the viewing surface is dependent upon the charge applied to the particles and the polarity of the voltage V1.

Referring to FIG. 17, assuming that a red color is viewable (100 percent red), then for each voltage V1 applied to the corresponding electrodes within a corresponding sub-frame, a limited amount of red particles moves away (for example) from the viewing surface.

Hence, in accordance with the principles of the invention, if a gray scale value of 3 for the red color is required then voltage V1 is applied to the corresponding electrodes of the red particle cell beginning at subframe 13. Concurrently, if a gray scale value of 1 for a blue color cell is required then voltage V1 is applied to the corresponding electrodes of the blue particle cell beginning at subframe 15. Furthermore, if a gray scale value of 14 for a green color cell is required then voltage V1 is applied to the corresponding electrodes of the green particle cell beginning at subframe 2.

Hence, in accordance with the principles of the invention, the drive voltages (V1) applied to each of the red, blue and green cells are applied at different start time and concurrently removed at the end of the display frame resulting in a stable image.

Figure 18:
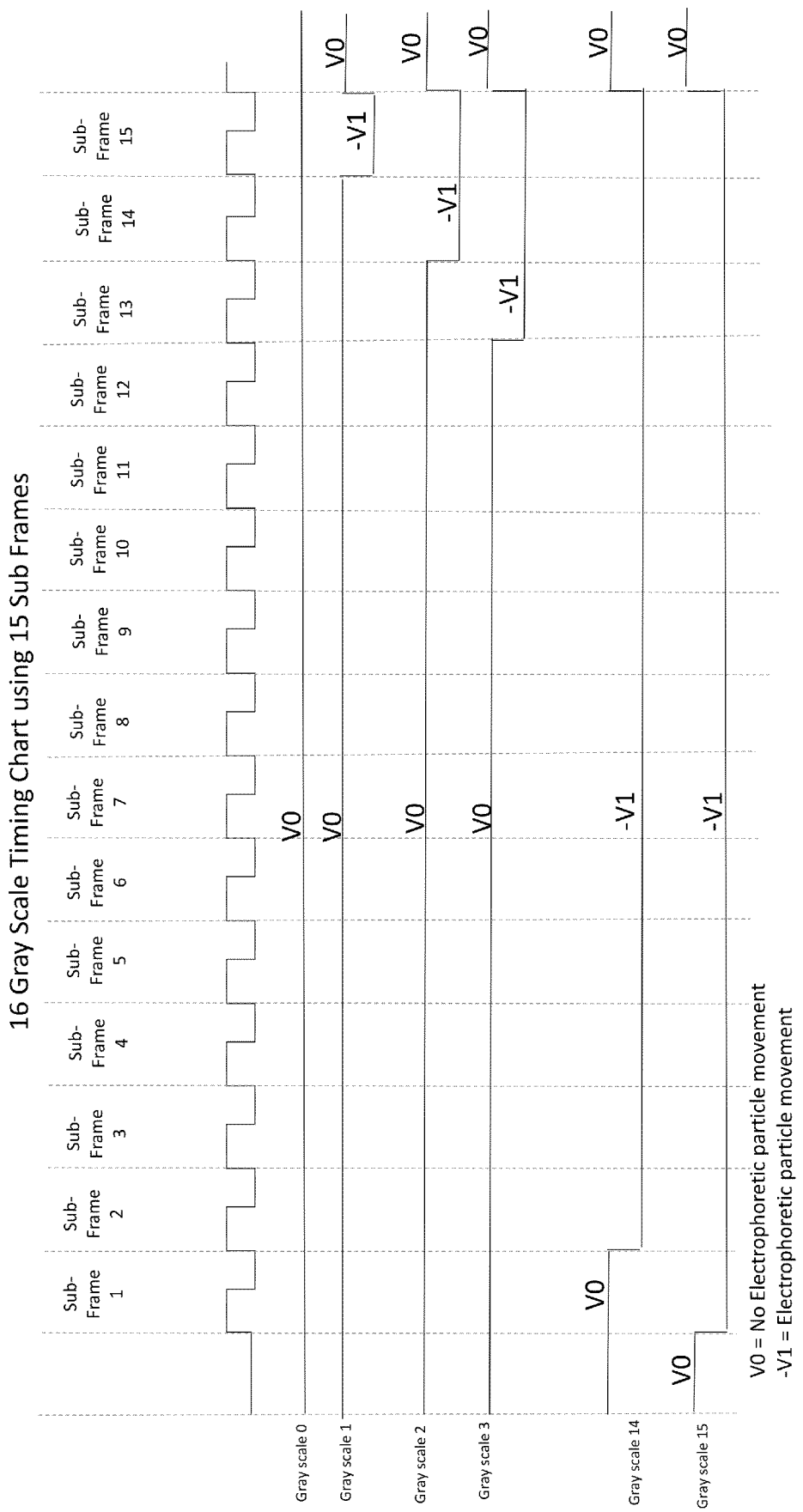

FIG. 18 illustrates, similar to FIG. 17, an exemplary Gray scale timing diagram, wherein the polarity of the driving voltage in reversed. By reversing the polarity of the driving voltage each of the particle groups (i.e., positively charged and negatively charged particle groups) will each move in the opposite direction as compared to the polarity of the driving voltage shown in FIG. 17.

Figure 19:
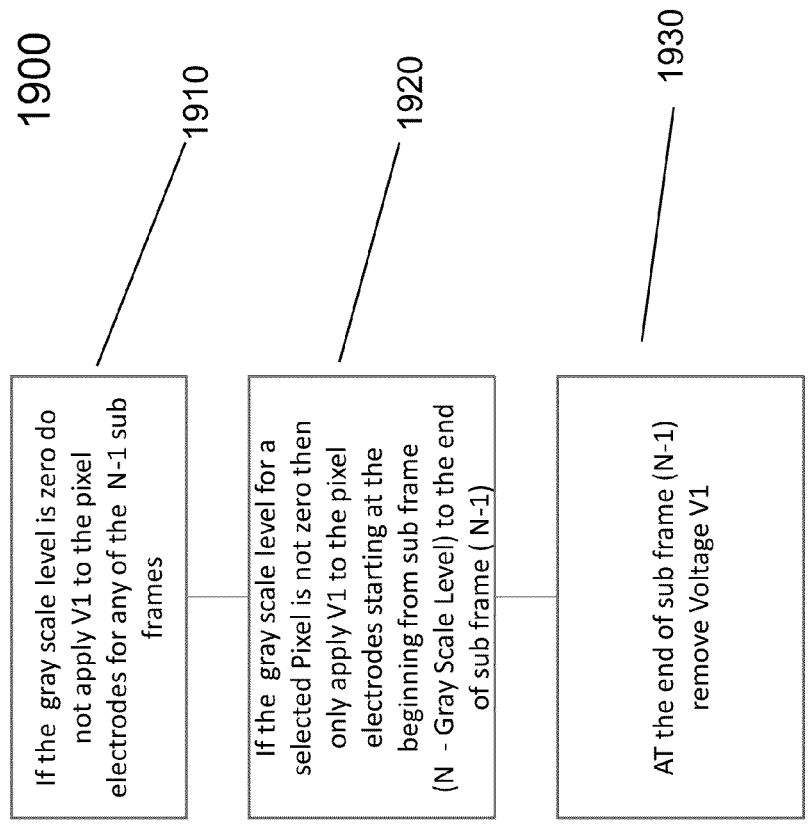
FIG. 19 illustrates a flow chart of an exemplary process in accordance with the principles of the invention.

FIG. 19 illustrates an exemplary flow chart 1900 for determining when a driving voltage is to be applied to a pixel (cell) in order to obtain appropriate Gray scale coding in accordance with the principles of the invention. At step 1910 a determination is made whether Gray scale coding is to be applied to the pixel (or cell). If not then the driving voltage (i.e., V1) is not applied to the pixel (or cell). However, if Gray scale coding is required, then a determination is made with regard to the level of Gray scale coding and a duration of the application of the driving voltage to the pixel (or cell) to achieve the desired level of Gray scale coding. A start time within a display frame time for the application of the driving voltage is then determined based on an end time of the display frame time (e.g., display frame time minus the duration). The drive voltage is then applied to the pixel (or cell) beginning at the determined start time. At block 1930, the end of the display frame time, the driving voltage is removed from the pixel or cell).

As would be appreciated, in a color electrophoretic display, in accordance with the principles of the invention, the driving voltage is removed concurrently from each of the individual color cells at the end of the display frame time, whereas a driving voltage is applied to corresponding color cells based on the desired level of Gray scale coding for each of the color cells.

The instant application has referred to US Patents that have issued and are assigned to the Assignee of the instant application to provide background materials regarding the subject matter claimed as the invention. The teachings of the aforementioned referred-to US Patents are incorporated by reference, as if stated in full, herein.

While there has been shown, described, and pointed out, fundamental novel features of the present invention as applied to the various embodiments thereof, it should be understood that various omissions and substitutions and changes in the apparatus and methods described, in the form and details of the devices disclosed, and in their operation, may be made by those skilled in the art without departing from the spirit of the present invention. For example, it is expressly intended that all combinations of those elements which perform substantially the same function in substantially the same way to achieve the same results are within the scope of the invention. Substitutions of elements from one described embodiment to another are also fully intended and contemplated.

For example, while the invention has been shown and described with regard to the substantially perpendicular anodes 18 and/or separation walls 92 extending from the transparent electrode, it should be understood that the anodes 18 or separation walk 93 may extend from the back substrate according to an aspect of the invention. In addition, while the invention has been shown and described with regard to a voltage being applied to the cathode to control the disposition of charged particles, it should eke be within the knowledge of those skilled in the art to apply the TFT based control voltage to the anodes to control the initial particle disposition, prior to filling with a suspension fluid. In addition, while the invention has been described with regard to a reflective or an opaque back substrate, it should also be within the knowledge of those skilled in the art to form an EPID having a transparent back substrate, and a reflective and/or opaque substrate having cathode elements thereon.

What is claimed is:

1. A display comprising:
   a first substrate, including:
      a plurality of first walls extending substantially perpendicular from an inner surface of said first substrate, said plurality of first walls having as top surface substantially parallel to said first substrate, said plurality of first walls forming a plurality of cells;
      a plurality of electrically conductive elements, each conductive element being associated with a corresponding one of said plurality of cells, said electrically conductive element being electrically isolated from each of said plurality of walls;
   a second substrate, separated from the first substrate by a known distance and forming a cavity between said first substrate and said second substrate,
      a plurality of second walls extending from said second substrate, said plurality of second walls having a tower edge substantially parallel to said second substrate, said plurality of second walls disposed substantially opposite from corresponding ones of said plurality of first walls,
   said plurality of first walls having a height less than said cavity, wherein a gap is formed-between the top surface of the first walls and the lower edge of a corresponding one of the second walls;
   a substantially clear, substantially particle free, suspension fluid contained within said cavity, said suspension fluid being substantially uniformly distributed throughout said cavity by being in fluid communication with each of said cells;
   a first plurality of electrically charged particles and a second plurality of electrically charged particles provided within each of said plurality of cells, said first, plurality of electrically charged particles having a different charge than said second plurality of electrically charged particles, said gap being sized to be less than a size of said particles in said first set and said second set of electrically charged particles; and
   means for applying a voltage to each of said plurality of electrically conductive elements for a selected period of time to achieve a desired level of color, wherein said selected period of time is measured from an end of a display frame.

2. The display of claim 1, further comprising;
   an insulating layer deposited on said electrically conductive elements.

3. The display of claim 1, further comprising:
   an electrode layer deposited on an inner surface of said second substrate.

4. The display of claim 1, wherein the particles in said first set of particles are black and the particles in said second set of particles are selected from a group consisting of: white, red, blue and green.

5. The display of claim 1, wherein said first substrate and said plurality of electrically conductive elements are selected from the group of: transparent and opaque materials.

6. The display of claim 1, further comprising:
   a TFT structure disposed on said inner surface of said first substrate, said TFT structure being arranged in a plurality of row and columns, wherein an intersection of one of said rows and one of said columns corresponds to one of said plurality of electrically conductive elements.

7. The display of claim 3, further comprising:
   means for applying a voltage to said electrode layer.

8. The display of claim 7, wherein said means for applying a voltage to a corresponding one of said plurality of electrically conductive elements is operable to apply a voltage that is greater than said voltage applied to said electrode layer.

9. The display of claim 7, wherein said means for applying a voltage to a corresponding one of said plurality of electrically conductive elements is operable to apply a voltage that is less than said voltage applied to said electrode layer.

10. An electrophoretic display device, comprising:
    a back substrate comprising:
       a plurality of second walls extending from said back substrate;
    a substrate, being selected from the group of transparent and opaque materials, positioned substantially opposite from said back substrate forming a substantially hollow container between said back substrate and said substrate, said container being sealed about its perimeter, said substrate comprising:
       a plurality of cathode electrodes supported by said substrate forming a plurality of electronically and selectively addressable pixels;

a plurality of separation walk extending from said substrate, said separation walls interposed between corresponding cathode electrodes and having a top surface substantially parallel to said substrate;

said plurality of second walls disposed substantially opposite from corresponding ones of said plurality of separation walls, said second walls having a lower edge, wherein a gap is formed between the lower edge of said plurality of second walls and the top surface of corresponding ones of said plurality of separation walls, said separation walls forming cells;

a plurality of pigment particles in each of said cells, the pigment particles in each of said cells comprised of light particles and dark particles;

a substantially clear, substantially particle free, suspension fluid disposed in said container, said suspension fluid being substantially uniformly distributed through said container through said gap, said gap being sized to be less than a size of said light particles and said dark particles within a corresponding cell; and means for applying a voltage to each of said plurality of cathode electrodes for a selected period of time to achieve a desired level of color, wherein said selected period of time is measured from an end of a display frame.

11. The device according to claim 10, wherein the substrate comprises a thin-film transistor active matrix substrate comprising one or more thin-film transistor driver circuits, each being electrically coupled to an associated pixel.

12. The device according to claim 10, wherein said dark pigment particles are black and said light pigment particles are selected from a group consisting of: white, red, green and blue.

13. The display of claim 10, wherein said separation walls extending from said substrate are composed of a material are selected from a group of: electrically conductive and electrically non-conductive materials.

14. A display comprising:
a first substrate, including:
a TFT layer including a plurality of Thin Film Transistors (TFT) arranged in an array of rows and columns;
a plurality of first walls extending substantially perpendicular from said first substrate, said plurality of first walls having a top surface substantially parallel to said first substrate, said plurality of first walls creating a plurality of cells corresponding to said array of TFTs;
an electrically conductive element within each of said cells in electrical contact with a corresponding TFT, said first walls and said electrically conductive element being electrically isolated;
an insulating layer deposited on said first substrate;
a second substrate, separated from the first substrate by a known distance to form a cavity between the first substrate and said second substrate,
a plurality of second walls extending from said second substrate, said plurality of second walls disposed substantially opposite from corresponding ones of said plurality of first walls, said second walls having a lower edge substantially parallel to said second substrates wherein a gap is formed in between said lower edge of said plurality of seconds walls and the top surface of corresponding ones of said plurality of first walls;
a clear, substantially particle free, suspension fluid contained within said cavity, said suspension fluid being substantially uniformly distributed throughout said cavity by being in fluid communication with each of the cells through said gap;
a first set and a second set of electrically charged particles contained within each of said cells, said first set of electrically charged particles having a different electrical charge that the second set, said gap being sized to contain said first set and second set of electrically charged particles within corresponding cells; and
means for applying a voltage to selected ones of the TFTs in the TFT array for as selected period of time to achieve a desired level of color, wherein said selected period of time is measured from an end of a display frame.

15. The display of claim 14, further comprising:
means for applying a voltage to said second substrate.

16. The display of claim 15, wherein the particles in said first set of particles are black and the particles in said second set of particles are selected from a group consisting of: white, red, blue, and green.

17. The display of claim 14, wherein said first substrate and electrically conductive elements are transparent.

18. The display of claim 14, wherein said second substrate is transparent.

19. The display of claim 14, wherein the plurality of first electrically charged particles contained within each of said cells has a size in the range of 10 nanometers to 5 microns.

* * * * *